US012474728B2

(12) United States Patent
Jackson et al.

(10) Patent No.: US 12,474,728 B2
(45) Date of Patent: Nov. 18, 2025

(54) FAIL-SAFE RELEASE MECHANISMS FOR USE WITH INTERCHANGEABLE PATIENT POSITIONING SUPPORT STRUCTURES

(71) Applicant: WARSAW ORTHOPEDIC INC., Warsaw, IN (US)

(72) Inventors: Roger P. Jackson, Prairie Village, KS (US); Lawrence Guerra, Mission, KS (US); Michael Herron, Overland, KS (US)

(73) Assignee: Warsaw Orthopedic, Inc., Warsaw, IN (US)

( * ) Notice: Subject to any disclaimer, the term of this patent is extended or adjusted under 35 U.S.C. 154(b) by 0 days.

(21) Appl. No.: 18/510,959

(22) Filed: Nov. 16, 2024

(65) Prior Publication Data

US 2025/0110522 A1 Apr. 3, 2025

Related U.S. Application Data

(63) Continuation of application No. 17/901,999, filed on Sep. 2, 2022, now Pat. No. 11,874,685, which is a
(Continued)

(51) Int. Cl.
*G05G 5/08* (2006.01)
*A61G 7/008* (2006.01)
(Continued)

(52) U.S. Cl.
CPC .............. *G05G 5/08* (2013.01); *A61G 7/008* (2013.01); *A61G 7/05* (2013.01); *A61G 13/0036* (2013.01);
(Continued)

(58) Field of Classification Search
CPC .... A61G 13/04; A61G 13/08; A61G 13/0036; A61G 13/0054; A61G 7/008; A61G 13/06; A61G 13/105; A61G 2200/325; A61G 2200/327; A61G 2203/70; A61G 2203/78; A61G 2210/50; A61G 7/05; A61G 13/101;
(Continued)

(56) References Cited

U.S. PATENT DOCUMENTS 377,377 A 2/1888 Ferry
392,743 A 11/1888 Millen
(Continued)

FOREIGN PATENT DOCUMENTS

CN 2467091 Y 12/2001
EP 2226010 B1 6/2014
(Continued)

OTHER PUBLICATIONS

U.S. Appl. No. 15/189,862, filed Jun. 22, 2016, Jackson et al.
(Continued)

*Primary Examiner* — Madison Emanski
(74) *Attorney, Agent, or Firm* — Sorell, Lenna & Schmidt, LLP

(57) ABSTRACT

A fail-safe release mechanism for use with patient positioning support apparati having a base structure and a patient support structure, to prevent collapse of the patient support structure during disconnection of the patient support structure from the base structure at outboard ends thereof.

20 Claims, 11 Drawing Sheets

Related U.S. Application Data continuation of application No. 15/849,072, filed on Dec. 20, 2017, now Pat. No. 11,435,776, which is a continuation of application No. 13/507,618, filed on Jul. 13, 2012, now Pat. No. 9,561,145.

(60) Provisional application No. 61/633,215, filed on Feb. 7, 2012.

(51) Int. Cl.
| | |
|---|---|
| *A61G 7/05* | (2006.01) |
| *A61G 13/00* | (2006.01) |
| *A61G 13/04* | (2006.01) |
| *A61G 13/06* | (2006.01) |
| *A61G 13/10* | (2006.01) |
| *E04G 25/06* | (2006.01) |

(52) U.S. Cl.
CPC .......... *A61G 13/0054* (2016.11); *A61G 13/04* (2013.01); *A61G 13/06* (2013.01); *A61G 13/105* (2013.01); *E04G 25/061* (2013.01); *A61G 2200/325* (2013.01); *A61G 2200/327* (2013.01); *A61G 2203/70* (2013.01); *A61G 2203/78* (2013.01); *A61G 2210/50* (2013.01)

(58) Field of Classification Search
CPC .. A61G 13/122; A61G 13/1235; A61G 7/015; G05G 5/08; A61B 6/0407; A61B 17/1671; A61B 2017/0256; E04G 25/061; F16G 11/10; F16G 11/105; F16M 11/041; F16M 13/022; F16B 2/18; F16B 2/185; F16B 12/56; F16C 11/0604
USPC .......... 5/607, 621, 610, 611, 613, 600, 624; 600/233; 606/279, 246; 128/845
See application file for complete search history.

(56) References Cited

U.S. PATENT DOCUMENTS

| | | | |
|---|---|---|---|
| 430,635 A | 6/1890 | Fox | |
| 987,423 A | 3/1911 | Barnett | |
| 1,046,430 A | 12/1912 | Beitz | |
| 1,098,477 A | 6/1914 | Cashman | |
| 1,143,618 A | 6/1915 | Ewald | |
| 1,160,451 A | 11/1915 | Sanford | |
| 1,171,713 A | 2/1916 | Gilkerson | |
| 1,356,467 A | 10/1920 | Payne | |
| 1,404,482 A | 1/1922 | Sawyer | |
| 1,482,439 A | 2/1924 | McCullough | |
| 1,528,835 A | 3/1925 | Mccullough | |
| 1,667,982 A | 5/1928 | Pearson | |
| 1,780,399 A | 11/1930 | Munson | |
| 1,799,692 A | 4/1931 | Knott | |
| 1,938,006 A | 12/1933 | Blanchard | |
| 1,990,357 A | 2/1935 | Ward | |
| 2,188,592 A | 1/1940 | Hosken et al. | |
| 2,261,297 A | 11/1941 | Seib | |
| 2,411,768 A | 11/1946 | Welch | |
| 2,475,003 A | 7/1949 | Black | |
| 2,636,793 A | 4/1953 | Meyer | |
| 2,688,410 A | 9/1954 | Nelson | |
| 2,792,945 A | 5/1957 | Brenny | |
| 3,046,071 A | 7/1962 | Shampaine et al. | |
| 3,049,726 A | 8/1962 | Getz | |
| 3,281,141 A | 10/1966 | Smiley et al. | |
| 3,302,218 A | 2/1967 | Stryker | |
| 3,584,321 A | 6/1971 | Buchanan | |
| 3,599,964 A | 8/1971 | Magni | |
| 3,640,416 A | 2/1972 | Temple | |
| 3,766,384 A | 10/1973 | Anderson | |
| 3,814,414 A | 6/1974 | Chapa | |
| 3,827,089 A | 8/1974 | Grow | |
| 3,832,742 A | 9/1974 | Stryker | |
| 3,937,054 A | 2/1976 | Hortvet et al. | |
| 3,988,790 A | 11/1976 | Mracek et al. | |
| 4,101,120 A | 7/1978 | Seshima | |
| 4,131,802 A | 12/1978 | Braden et al. | |
| 4,144,880 A | 3/1979 | Daniels | |
| 4,148,472 A | 4/1979 | Rais | |
| 4,175,550 A | 11/1979 | Leininger et al. | |
| 4,186,917 A | 2/1980 | Rais et al. | |
| 4,227,269 A | 10/1980 | Johnston | |
| 4,230,100 A | 10/1980 | Moon | |
| 4,244,358 A | 1/1981 | Pyers | |
| 4,292,962 A | 10/1981 | Krause | |
| 4,391,438 A | 7/1983 | Heffington, Jr. | |
| 4,435,861 A | 3/1984 | Lindley | |
| 4,474,364 A | 10/1984 | Brendgord | |
| 4,503,844 A | 3/1985 | Siczek | |
| 4,552,346 A | 11/1985 | Schnelle et al. | |
| 4,712,781 A | 12/1987 | Watanabe | |
| 4,715,073 A | 12/1987 | Butler | |
| 4,718,077 A | 1/1988 | Moore et al. | |
| 4,763,643 A | 8/1988 | Vrzalik | |
| 4,771,785 A | 9/1988 | Duer | |
| 4,830,337 A | 5/1989 | Ichiro et al. | |
| 4,850,775 A | 7/1989 | Lee et al. | |
| 4,862,529 A | 9/1989 | Peck | |
| 4,872,656 A | 10/1989 | Brendgord et al. | |
| 4,872,657 A | 10/1989 | Lussi | |
| 4,887,325 A | 12/1989 | Tesch | |
| 4,937,901 A | 7/1990 | Brennan | |
| 4,939,801 A | 7/1990 | Schaal et al. | |
| 4,944,500 A | 7/1990 | Mueller et al. | |
| 4,953,245 A | 9/1990 | Jung | |
| 4,970,737 A | 11/1990 | Sagel | |
| 4,989,848 A | 2/1991 | Monroe | |
| 5,013,018 A | 5/1991 | Sicek et al. | |
| 5,088,706 A * | 2/1992 | Jackson | A61G 13/00 5/608 |
| 5,131,103 A | 7/1992 | Thomas et al. | |
| 5,131,105 A | 7/1992 | Harrawood et al. | |
| 5,131,106 A * | 7/1992 | Jackson | A61G 13/00 5/607 |
| 5,161,267 A | 11/1992 | Smith | |
| 5,163,890 A | 11/1992 | Perry, Jr. | |
| 5,177,823 A * | 1/1993 | Riach | A61G 15/125 5/636 |
| 5,181,289 A | 1/1993 | Kassai | |
| 5,208,928 A | 5/1993 | Kuck et al. | |
| 5,210,887 A | 5/1993 | Kershaw | |
| 5,210,888 A | 5/1993 | Canfield | |
| 5,230,112 A | 7/1993 | Harrawood et al. | |
| 5,231,741 A | 8/1993 | Maguire | |
| 5,239,716 A | 8/1993 | Fisk | |
| 5,274,862 A | 1/1994 | Palmer, Jr. | |
| 5,294,179 A | 3/1994 | Rudes et al. | |
| 5,333,334 A | 8/1994 | Kassai | |
| 5,393,018 A | 2/1995 | Roth et al. | |
| 5,444,882 A | 8/1995 | Andrews et al. | |
| 5,461,740 A | 10/1995 | Pearson | |
| 5,468,216 A | 11/1995 | Johnson et al. | |
| 5,487,195 A | 1/1996 | Ray | |
| 5,499,408 A | 3/1996 | Nix | |
| 5,524,304 A | 6/1996 | Shutes | |
| 5,544,371 A | 8/1996 | Fuller | |
| 5,579,550 A | 12/1996 | Bathrick et al. | |
| 5,588,705 A | 12/1996 | Chang | |
| 5,613,254 A | 3/1997 | Clayman et al. | |
| 5,640,730 A | 6/1997 | Godette | |
| 5,645,079 A | 7/1997 | Zahiri et al. | |
| 5,658,315 A | 8/1997 | Lamb et al. | |
| 5,659,909 A | 8/1997 | Pfeuffer et al. | |
| 5,673,443 A | 10/1997 | Marmor | |
| 5,737,781 A | 4/1998 | Votel | |
| 5,754,997 A | 5/1998 | Lussi et al. | |
| 5,774,914 A | 7/1998 | Johnson et al. | |
| 5,794,286 A | 8/1998 | Scott et al. | |
| 5,829,077 A | 11/1998 | Neige | |
| 5,862,549 A | 1/1999 | Morton et al. | |
| 5,870,784 A | 2/1999 | Elliott | |
| 5,890,238 A | 4/1999 | Votel | |

(56) References Cited

U.S. PATENT DOCUMENTS

| | | |
|---|---|---|
| 5,901,388 A | 5/1999 | Cowan |
| 5,937,456 A | 8/1999 | Norris |
| 5,940,911 A | 8/1999 | Wang |
| 5,996,151 A | 12/1999 | Bartow et al. |
| 6,000,076 A | 12/1999 | Webster et al. |
| 6,035,465 A | 3/2000 | Rogozinski |
| 6,049,923 A | 4/2000 | Ochiai |
| 6,058,532 A | 5/2000 | Allen |
| 6,109,424 A | 8/2000 | Doan |
| 6,212,713 B1 | 4/2001 | Kuck et al. |
| 6,224,037 B1 | 5/2001 | Novick |
| 6,240,582 B1 | 6/2001 | Reinke |
| 6,260,220 B1 | 7/2001 | Lamb et al. |
| 6,282,736 B1 | 9/2001 | Hand et al. |
| 6,282,738 B1 | 9/2001 | Heimbrock et al. |
| 6,286,164 B1 | 9/2001 | Lamb et al. |
| 6,287,241 B1 | 9/2001 | Ellis |
| 6,295,666 B1 | 10/2001 | Takaura |
| 6,295,671 B1 | 10/2001 | Reesby et al. |
| 6,315,564 B1 | 11/2001 | Levisman |
| 6,322,251 B1 | 11/2001 | Ballhaus et al. |
| 6,438,777 B1 | 8/2002 | Bender |
| 6,496,991 B1 | 12/2002 | Votel |
| 6,499,162 B1 | 12/2002 | Lu |
| 6,505,365 B1 | 1/2003 | Hanson et al. |
| 6,526,610 B1 | 3/2003 | Hand et al. |
| 6,634,043 B2 | 10/2003 | Lamb et al. |
| 6,638,299 B2 | 10/2003 | Cox |
| 6,662,388 B2 | 12/2003 | Friel |
| 6,668,396 B2 | 12/2003 | Wei |
| 6,681,423 B2 | 1/2004 | Zachrisson |
| 6,701,553 B1 | 3/2004 | Hand et al. |
| 6,779,210 B1 | 8/2004 | Kelly |
| 6,791,997 B2 | 9/2004 | Beyer et al. |
| 6,794,286 B2 | 9/2004 | Aoyama et al. |
| 6,817,363 B2 | 11/2004 | Biondo et al. |
| 6,854,137 B2 | 2/2005 | Johnson |
| 6,857,144 B1 | 2/2005 | Huang |
| 6,862,759 B2 | 3/2005 | Hand et al. |
| 6,885,165 B2 | 4/2005 | Henley et al. |
| 6,971,131 B2 | 12/2005 | Bannister |
| 6,971,997 B1 | 12/2005 | Ryan et al. |
| 7,003,828 B2 | 2/2006 | Roussy |
| 7,055,195 B2 | 6/2006 | Roussy |
| 7,089,612 B2 | 8/2006 | Rocher et al. |
| 7,103,931 B2 | 9/2006 | Somasundaram et al. |
| 7,137,160 B2 | 11/2006 | Hand et al. |
| 7,152,261 B2 | 12/2006 | Jackson |
| 7,171,709 B2 | 2/2007 | Weismiller |
| 7,189,214 B1 | 3/2007 | Saunders |
| 7,197,778 B2 | 4/2007 | Sharps |
| 7,213,279 B2 | 5/2007 | Weismiller et al. |
| 7,234,180 B2 | 6/2007 | Horton et al. |
| 7,290,302 B2 | 11/2007 | Sharps |
| 7,331,557 B2 | 2/2008 | Dewert |
| 7,343,635 B2 | 3/2008 | Jackson |
| 7,428,760 B2 | 9/2008 | McCrimmon |
| 7,552,490 B2 | 6/2009 | Saracen et al. |
| 7,565,708 B2 | 7/2009 | Jackson |
| 7,596,820 B2 | 10/2009 | Nielsen et al. |
| 7,653,953 B2 | 2/2010 | Lopez-Sansalvador |
| 7,669,262 B2 | 3/2010 | Skripps et al. |
| 7,739,762 B2 | 6/2010 | Lamb et al. |
| 7,874,695 B2 | 1/2011 | Jensen |
| 8,056,163 B2 | 11/2011 | Lemire et al. |
| 8,060,960 B2 | 11/2011 | Jackson |
| 8,381,331 B2 | 2/2013 | Sharps et al. |
| 8,584,281 B2 | 11/2013 | Diel et al. |
| 8,635,725 B2 | 1/2014 | Tannoury et al. |
| 8,677,529 B2 | 3/2014 | Jackson |
| 8,707,476 B2 | 4/2014 | Sharps |
| 8,707,484 B2 | 4/2014 | Jackson |
| 8,719,979 B2 | 5/2014 | Jackson |
| 8,826,474 B2 | 9/2014 | Jackson |
| 8,826,475 B2 | 9/2014 | Jackson |
| 8,839,471 B2 | 9/2014 | Jackson |
| 8,844,077 B2 | 9/2014 | Jackson et al. |
| 8,856,986 B2 | 10/2014 | Jackson |
| D720,076 S | 12/2014 | Sharps et al. |
| 8,938,826 B2 | 1/2015 | Jackson |
| 8,978,180 B2 | 3/2015 | Jackson |
| 9,180,062 B2 | 11/2015 | Jackson |
| 9,186,291 B2 | 11/2015 | Jackson et al. |
| 9,198,817 B2 | 12/2015 | Jackson |
| 9,205,013 B2 | 12/2015 | Jackson |
| 9,211,223 B2 | 12/2015 | Jackson |
| 9,265,680 B2 | 2/2016 | Sharps et al. |
| 9,295,433 B2 | 3/2016 | Jackson et al. |
| 2001/0037524 A1 | 11/2001 | Truwit |
| 2002/0170116 A1 | 11/2002 | Borders et al. |
| 2003/0074735 A1 | 4/2003 | Zachrisson |
| 2003/0145383 A1 | 8/2003 | Schwaegerle |
| 2004/0098804 A1 | 5/2004 | Varadharajulu et al. |
| 2004/0133983 A1 | 7/2004 | Newkirk et al. |
| 2004/0168253 A1 | 9/2004 | Hand et al. |
| 2004/0219002 A1 | 11/2004 | Lenaers |
| 2006/0248650 A1 | 11/2006 | Skripps |
| 2007/0056105 A1 | 3/2007 | Hyre et al. |
| 2007/0107126 A1 | 5/2007 | Koch et al. |
| 2007/0157385 A1 | 7/2007 | Lemire et al. |
| 2007/0174965 A1 | 8/2007 | Lemire et al. |
| 2007/0192960 A1* | 8/2007 | Jackson ............... A61G 13/0054 5/607 |
| 2007/0266516 A1 | 11/2007 | Cakmak |
| 2008/0216241 A1 | 9/2008 | Mangiardi |
| 2009/0126116 A1 | 5/2009 | Lamb et al. |
| 2010/0037397 A1 | 2/2010 | Wood |
| 2010/0107790 A1 | 5/2010 | Yamaguchi |
| 2010/0192300 A1 | 8/2010 | Tannoury et al. |
| 2010/0223728 A1 | 9/2010 | Hutchison et al. |
| 2011/0083273 A1* | 4/2011 | Sharps ............... A61G 13/0054 5/624 |
| 2011/0107517 A1 | 5/2011 | Lamb et al. |
| 2011/0197361 A1 | 8/2011 | Hornbach et al. |
| 2012/0005832 A1 | 1/2012 | Turner et al. |
| 2012/0144589 A1* | 6/2012 | Skripps ............... A61G 13/0054 5/624 |
| 2012/0174319 A1 | 7/2012 | Menkedick |
| 2012/0198625 A1 | 8/2012 | Jackson |
| 2012/0246829 A1 | 10/2012 | Lamb et al. |
| 2012/0246830 A1 | 10/2012 | Hornbach |
| 2013/0111666 A1 | 5/2013 | Jackson |
| 2013/0133137 A1 | 5/2013 | Jackson |
| 2013/0198958 A1 | 8/2013 | Jackson et al. |
| 2013/0219623 A1 | 8/2013 | Jackson |
| 2013/0254995 A1 | 10/2013 | Jackson |
| 2013/0269710 A1 | 10/2013 | Hight et al. |
| 2013/0282234 A1 | 10/2013 | Roberts et al. |
| 2013/0312187 A1 | 11/2013 | Jackson |
| 2013/0312188 A1 | 11/2013 | Jackson |
| 2014/0007349 A1 | 1/2014 | Jackson |
| 2014/0020181 A1 | 1/2014 | Jackson |
| 2014/0033436 A1 | 2/2014 | Jackson |
| 2014/0068861 A1 | 3/2014 | Jackson et al. |
| 2014/0082842 A1 | 3/2014 | Jackson |
| 2014/0109316 A1 | 4/2014 | Jackson et al. |
| 2014/0173826 A1 | 6/2014 | Jackson |
| 2014/0196212 A1 | 7/2014 | Jackson |
| 2014/0201913 A1 | 7/2014 | Jackson |
| 2014/0201914 A1 | 7/2014 | Jackson |
| 2014/0208512 A1 | 7/2014 | Jackson |
| 2014/0317847 A1 | 10/2014 | Jackson |
| 2015/0007391 A1 | 1/2015 | Xu |
| 2015/0059094 A1 | 3/2015 | Jackson |
| 2015/0113733 A1 | 4/2015 | Diel et al. |
| 2015/0150743 A1 | 6/2015 | Jackson |
| 2016/0000620 A1 | 1/2016 | Koch |
| 2016/0000621 A1 | 1/2016 | Jackson et al. |
| 2016/0000626 A1 | 1/2016 | Jackson et al. |
| 2016/0000627 A1 | 1/2016 | Jackson et al. |
| 2016/0000629 A1 | 1/2016 | Jackson et al. |
| 2016/0008201 A1 | 1/2016 | Jackson et al. |
| 2016/0038364 A1 | 2/2016 | Jackson |

(56) References Cited

U.S. PATENT DOCUMENTS

| | | |
|---|---|---|
| 2016/0136027 A1 | 5/2016 | Jackson |
| 2016/0166452 A1 | 6/2016 | Jackson et al. |
| 2016/0213542 A1 | 7/2016 | Jackson |

FOREIGN PATENT DOCUMENTS

| | | |
|---|---|---|
| GB | 569758 | 6/1945 |
| GB | 810956 | 3/1959 |
| JP | S53763 | 1/1978 |
| JP | 2000-060995 | 2/2000 |
| JP | 2000-116733 | 4/2000 |
| WO | WO99/07320 | 2/1999 |
| WO | WO 00/07537 | 2/2000 |
| WO | WO2000/062731 | 10/2000 |
| WO | WO2001/060308 | 8/2001 |
| WO | WO 02/078589 | 10/2002 |
| WO | WO2003/070145 | 8/2003 |
| WO | WO 2007/130679 A2 | 11/2007 |
| WO | WO2009/054969 | 4/2009 |
| WO | WO2009/100692 | 8/2009 |
| WO | WO2010/051303 A1 | 5/2010 |

OTHER PUBLICATIONS

U.S. Appl. No. 15/189,890, filed Jun. 22, 2016, Jackson et al.
U.S. Appl. No. 15/207,599, filed Jul. 12, 2016, Jackson.
U.S. Appl. No. 15/210,339, filed Jul. 14, 2016, Jackson et al.
U.S. Appl. No. 15/234,556, filed Aug. 11, 2016, Jackson et al.
Brochure of Smith & Nephew on Spinal Positioning System, 2003, 2004.
Complaint for Patent Infringement, *Jackson v. Mizuho Orthopedic Sys., Inc.*, No. 4:12-CV-01031 (W.D. Mo. Aug. 7, 2012).
First Amended Complaint for Patent Infringement And Correction of Inventorship, *Jackson v. Mizuho Orthopedic Sys., Inc.*, No. 4:12-CV-01031 (W.D. Mo. Sep. 21, 2012).
Defendant Mizuho Orthopedic Systems, Inc.'s Answer to First Amended Complaint and Counterclaims, *Jackson v. Mizuho Orthopedic Sys., Inc.*, No. 4:12-CV-01031 (W.D. Mo. Nov. 1, 2012).
Plaintiff Roger P. Jackson, MD's, Reply to Counterclaims, *Jackson v. Mizuho Orthopedic Sys., Inc.*, No. 4:12-CV-01031 (W.D. Mo. Nov. 26, 2012).
Roger P. Jackson's Disclosure of Asserted Claims and Preliminary Infringement Contentions, *Jackson v. Mizuho Orthopedic Sys., Inc.*, No. 4:12-CV-01031 (W.D. Mo. Jan. 4, 2013).
Second Amended Complaint for Patent Infringement, for Correction of Inventorship, for Breach of a Non-Disclosure and Confidentiality Agreement, and for Misappropriation of Dr. Jackson's Right of Publicity, *Jackson v. Mizuho Orthopedic Sys., Inc.*, No. 4:12-CV-01031 (W.D. Mo. Jan. 28, 2013).
Defendant Mizuho Orthopedic Systems, Inc.'s Answer to Second Amended Complaint and Counterclaims, *Jackson v. Mizuho Orthopedic Sys., Inc.*, No. 4:12-CV-01031 (W.D. Mo. Feb. 19, 2013).
Defendant Mizuho Osi's Invalidity Contentions Pursuant to the Parties' Joint Scheduling Order, *Jackson v. Mizuho Orthopedic Sys., Inc.*, No. 4:12-CV-01031 (W.D. Mo. Feb. 22, 2013).
Plaintiff Roger P. Jackson, MD's, Reply To Second Counterclaims, *Jackson v. Mizuho Orthopedic Sys., Inc.*, No. 4:12-CV-01031 (W.D, Mo. Mar. 12, 2013).
Roger P. Jackson, MD's Disclosure of Proposed Terms to be Construed, *Jackson v. Mizuho Orthopedic Sys., Inc.*, No. 4:12-CV-01031 (W.D. Mo. Apr. 5, 2013).
Defendant Mizuho Orthopedic Systems, Inc.'s Disclosure of Proposed Terms and Claim Elements for Construction, *Jackson v. Mizuho Orthopedic Sys., Inc.*, No. 4:12-CV-01031 (W.D. Mo. Apr. 5, 2013).
Mizuho Orthopedic Systems, Inc.'s Disclosure of Proposed Claim Constructions and Extrinsic Evidence, *Jackson v. Mizuho Orthopedic Sys., Inc.*, No. 4:12-CV-01031 (W.D. Mo. May 13, 2013).
Plaintiff Roger P. Jackson, MD's Disclosure of Preliminary Proposed Claim Constructions, *Jackson v. Mizuho Orthopedic Sys., Inc.*, No. 4:12-CV-01031 (W.D. Mo. May 13, 2013).
Defendant Mizuho Osi's Amended Invalidity Contentions Pursuant to the Parties' Joint Scheduling Order, *Jackson v. Mizuho Orthopedic Sys., Inc.*, No. 4:12-CV-01031 (W.D. Mo. May 15, 2013).
Joint Claim Construction Chart and Joint Prehearing Statement, *Jackson v. Mizuho Orthopedic Sys., Inc.*, No. 4:12-CV-01031 (W.D. Mo. Jun. 7, 2013).
Defendant Mizuho Orthopedic Systems, Inc.'s Objections and Responses to Plaintiff's First Set of Interrogatories, *Jackson v. Mizuho Orthopedic Sys., Inc.*, No. 4:12-CV-01031 (W.D. Mo. Jun. 24, 2013).
Defendant Mizuho Orthopedic Systems, Inc.'s Opening Claim Construction Brief, *Jackson v. Mizuho Orthopedic Sys., Inc.*, No. 4:12-CV-01031 (W.D. Mo. Jul. 31, 2013).
Plaintiff Roger P. Jackson, MD's Opening Claim Construction Brief, *Jackson v. Mizuho Orthopedic Sys., Inc.*, No. 4:12-CV-01031 (W.D. Mo. Jul. 31, 2013).
Appendix A Amended Infringement Contentions Claim Chart for Mizuho's Axis System Compared to U.S. Pat. No. 7,565,708, *Jackson v. Mizuho Orthopedic Sys., Inc.*, No. 4:12-CV-01031 (W.D. Mo. Aug. 12, 2013).
Appendix B Amended Infringement Contentions Claim Chart for Mizuho's Axis System Compared to U.S. Pat. No. 8,060,960, *Jackson v. Mizuho Orthopedic Sys., Inc.*, No. 4:12-CV-01031 (W.D. Mo. Aug. 12, 2013).
Appendix C Amended Infringement Contentions Claim Chart for Mizuho's Proaxis System Compared to U.S. Pat. No. 7,565,708, *Jackson v. Mizuho Orthopedic Sys., Inc.*, No. 4:12-CV-01031 (W.D. Mo. Aug. 12, 2013).
Appendix D Amended Infringement Contentions Claim Chart for Mizuho's Proaxis System Compared to U.S. Pat. No. 8,060,960, *Jackson v. Mizuho Orthopedic Sys., Inc.*, No. 4:12-CV-01031 (W.D. Mo. Aug. 12, 2013).
Plaintiff Roger P. Jackson, MD's Responsive Claim Construction Brief, *Jackson v. Mizuho Orthopedic Sys., Inc.*, No. 4:12-CV-01031 (W.D. Mo. Aug. 16, 2013).
Defendant Mizuho Orthopedic Systems, Inc's Brief in Response to Plaintiff's Opening Claim Construction Brief, *Jackson v. Mizuho Orthopedic Sys., Inc.*, No. 4:12-CV-01031 (W.D. Mo. Aug. 16, 2013).
Plaintiff Roger P. Jackson, Md's Suggestions in Support of His Motion to Strike Exhibit A of Mizuho's Opening Claim Construction Brief, *Jackson v. Mizuho Orthopedic Sys., Inc.*, No. 4:12-CV-01031 (W.D. Mo. Aug. 16, 2013).
Defendant Mizuho Orthopedic Systems, Inc.'s Opposition to Plaintiff's Motion to Strike, *Jackson v. Mizuho Orthopedic Sys., Inc.*, No. 4:12-CV-01031 (W.D. Mo. Sep. 3, 2013).
Transcript of Claim Construction Hearing, *Jackson v. Mizuho Orthopedic Sys., Inc.*, No. 4:12-CV-01031 (W.D. Mo. Oct. 11, 2013).
Plaintiff Roger P. Jackson, MD's Claim Construction Presentation for U.S. District Judge Nanette K. Laughrey, *Jackson v. Mizuho Orthopedic Sys., Inc.*, No. 4:12-CV-01031 (W.D. Mo. Oct. 11, 2013).
Mizuho's Claim Construction Argument, *Jackson v. Mizuho Orthopedic Sys., Inc.*, No. 4:12-CV-01031 (W.D. Mo. Oct. 11, 2013).
Order, *Jackson v. Mizuho Orthopedic Sys., Inc.*, No. 4:12-CV-01031 (W.D. Mo. Apr. 4, 2014).
Brochure of OSI on Modular Table System 90D, pp. 1-15, date of first publication: Unknown.
Pages from website http://www.schaerermayfieldusa.com, pp. 1-5, date of first publication: Unknown.
European Search Report, EP11798501.0, dated Mar. 30, 2015.
Canadian Office Action, CA2803110, dated Mar. 5, 2015.
Chinese Office Action, CN 201180039162.0, dated Jan. 19, 2015.
Japanese Office Action, JP 2014-142074, dated Jun. 18, 2015.
Japanese Office Action, JP 2014-132463, dated Jun. 18, 2015.
Quayle Action, U.S. Appl. No. 14/792,216, dated Sep. 9, 2015.
Australian Patent Examination Report No. 2, AU2014200274, dated Oct. 9, 2015.
European Examination Report, EP11798501.0, dated Nov. 12, 2015.

(56) References Cited

OTHER PUBLICATIONS

Japanese Final Rejection (English version), JP 2014-142074, dated Dec. 6, 2015.
International Search Report and Written Opinion of the International Searching Authority, PCT/US2015/039400, dated Dec. 7, 2015, 13 pages.
Japanese Office Action, JP 2016-041088, dated Apr. 12, 2016.

* cited by examiner

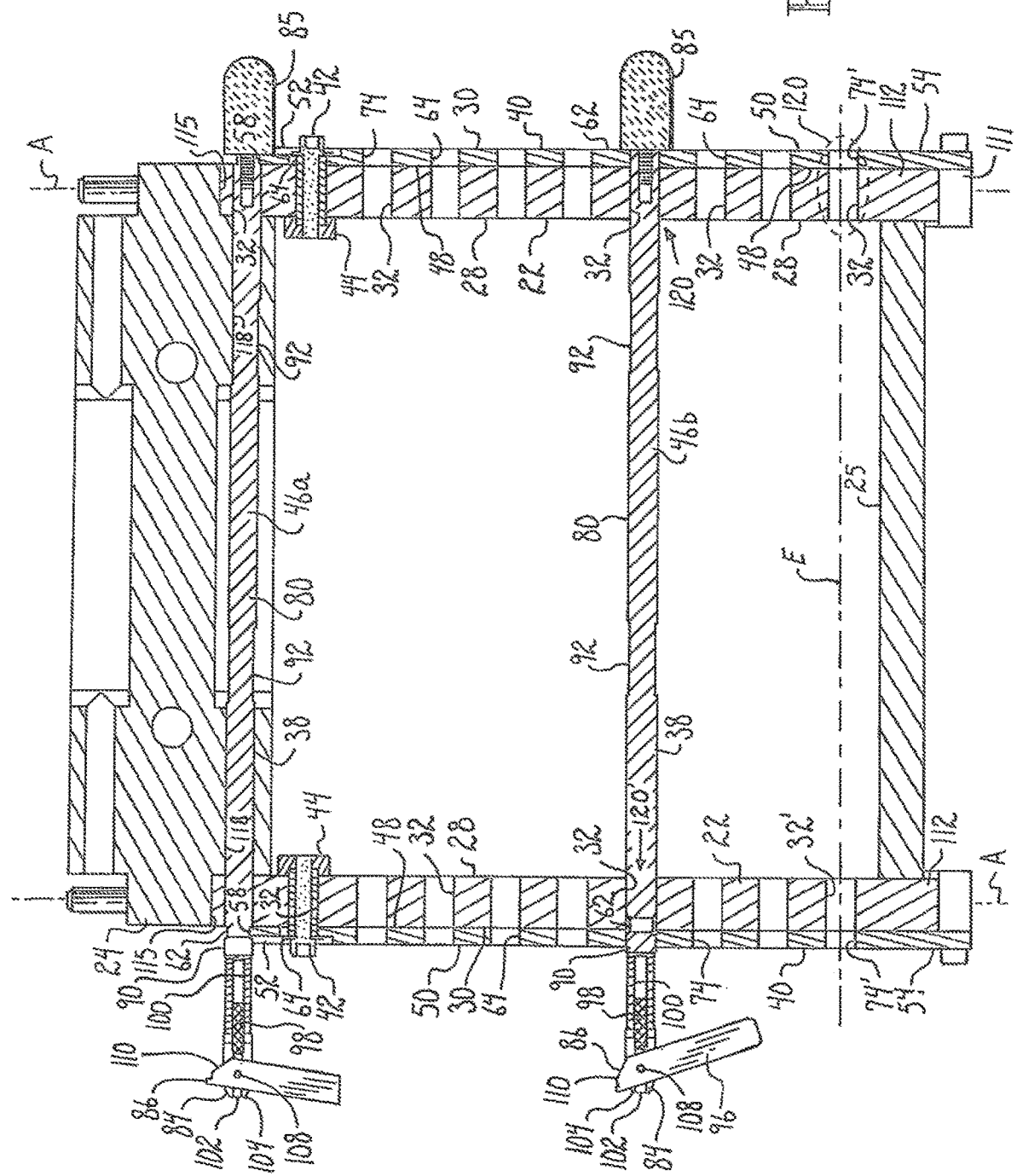

FAIL-SAFE RELEASE MECHANISMS FOR USE WITH INTERCHANGEABLE PATIENT POSITIONING SUPPORT STRUCTURES

CROSS-REFERENCE TO RELATED APPLICATIONS

This application is a continuation of U.S. patent application Ser. No. 17/901,999, filed Sep. 2, 2022, which is a continuation of U.S. patent application Ser. No. 15/849,072, filed Dec. 20 2017, now U.S. Pat. No. 11,435,776, which is a continuation of U.S. patent application Ser. No. 15/234,209, filed Aug. 11, 2016, now U.S. Pat. No. 9,877,883, which is a continuation of U.S. patent application Ser. No. 13/507,618, filed Jul. 13, 2012, now U.S. Pat. No. 9,561,145, which claims the benefit of U.S. Provisional Application No. 61/633,215, which was filed on Feb. 7, 2012 and entitled "Fail-Safe Apparatus For Use With Patient Positioning Support Systems." These applications are expressly incorporated herein by reference, in their entireties.

BACKGROUND OF THE INVENTION

The present invention is directed to a fail-safe release mechanism, apparatus or device, for use with patient positioning support apparati, or surgical tables, that include at least one elongate patient support structure, frame or imaging table top removably connected or joined at both ends thereof to upright end supports of a base structure by spaced opposed connection subassemblies. Exemplary patient support structures, for use with the present invention, may include a pair of spaced opposed hinges or joints, so as to be angulatable, or articulatable. Such hinges can be actively driven or passively moved. The exemplary patient support structures may also have a length adjustment feature, such as a telescoping mechanism, a translator connector, a slider bar or some other type of translation compensation mechanism. It is foreseen that this length adjustment mechanism or structure could be part of or incorporated within one or both connection subassemblies. It could also be within the base itself, in the form of a telescoping parts, bearing blocks or other appropriate structure.

SUMMARY OF THE INVENTION

The fail-safe release mechanism of the present invention is adapted for use with patient positioning support apparati, which include one or more connection subassemblies releasably joining a base structure with at least one patient support structure. The claimed fail-safe release mechanism substantially prevents the improper disconnection of the patient support structure from the base structure and in some cases the connection subassembly from the upright ends of the base, all of which is described in greater detail below. In some circumstances, a second patient support structure, frame or imaging table top is also removably attached to the base structure, to provide for sandwiching and rolling of a patient. The fail-safe release mechanism of the present invention can also be used with the second patient support structure, to prevent the improper disconnection of the second patient support structure from the base structure.

The fail-safe release mechanism includes a two-part interlock, and is at least one of a direct mechanical link type apparatus and a software synchronized mechanism or system that does not permit release of one part of the interlock before the other part. The software can operate an electronic release mechanism, such as by one or more solenoids that are not entirely disconnected from the patient positioning support apparatus, including the base upright end supports and the connection subassemblies.

In some embodiments, the fail-safe release mechanism is dependent upon at least one of the orientation of the patient support structure and the amount of load or patient weight thereon. For example, in some embodiments, the patient support structure can only be released or removed from the connection subassembly, which is attached to the base structure, when the patient support structure is in an upside down position or orientation relative to the base structure, as opposed to being right side up. In another example, in some embodiments, the weight of a patient on the patient support structure causes a change in the attachment between the patient support structure and the connection subassembly, such that this attachment becomes substantially more difficult to break or release, relative to when no patient is on the patient support structure, thereby rendering the attachment between the connection subassembly and the base structure unbreakable or not releaseable. For example, the increased load may cause an increase in the strength of the attachment between the patient support structure and the connection subassembly relative to the strength of this attachment when the load is not increased. This would also be true for the release of the connection subassembly from the base structure, if the embodiment includes that functionality.

The electronics of a fail-safe release mechanism can include a hand-held pendant to operate the releases and subsequent detachments of the various table or patient positioning support apparatus components.

In a first embodiment, a fail-safe release mechanism is provided for use in conjunction with a medical patient support structure wherein at least a first end of the patient support structure is raisable and the fail-safe release mechanism prevents inadvertent falling of the first end. This fail-safe release mechanism includes a first lock that releasably secures the first end in a raised position thereof and a releaseable second lock that cooperates with and is interlocked with the first lock when the first end is in the raised position and prevents release of the first lock until the second is released.

In a second embodiment, a fail-safe release mechanism for use with a patient positioning support apparatus having a patient support structure removably attached to a base structure of the apparatus by a connection subassembly is provided. This fail-safe release mechanism includes a reversibly engageable first attachment lock with engaged and disengaged positions, wherein the first attachment lock includes a first attachment between the base structure and the connection subassembly; and a reversibly engageable second attachment lock with engaged and disengaged configurations, wherein the second attachment lock includes a second attachment between the connection subassembly and the patient support structure; wherein engagement of the second attachment lock substantially blocks disengagement of the first attachment lock.

In a first aspect of the second embodiment, the first attachment includes a first removable locking member; and the second attachment includes a second removable locking member.

In a second aspect of the second embodiment, the fail-safe release mechanism includes a lock structure cooperating with the first and second attachments.

In a third aspect of the second embodiment, the fail-safe release mechanism includes a side member that is slidably attached to the connection subassembly and cooperates with the first and second attachments. In a further aspect of the second embodiment, the side member is a pair of opposed side members; and each of the side members is associated with an end of the patient support structure.

In a third embodiment, a fail-safe release apparatus is provided for use with a patient positioning support apparatus that has a patient support structure that is removably hingeably attached to a base structure by a removable connection pin or other appropriate structure, and the patient positioning support apparatus also has a connection subassembly that includes a pair of longitudinally aligned spaced arms, and each of the arms includes inner and outer sides and an array of apertures extending between the inner and outer sides, and the apertures are spaced along a length of the respective arm, and each aperture of a first of the arms is paired with an opposed aperture of a second of the arms, and the paired apertures cooperate with one another so as to enable receipt of a connection pin, rod or other elongate structure or structures through both of the cooperating opposed apertures, and the received connection pin, integral or segmented, has an orientation transverse to a longitudinal axis of each of the arms; and the fail-safe release mechanism includes a pair of locking members, each locking member being attached to the outer side of one of the arms, each of the locking members having an inner surface slidingly engaging an outer surface of the respective attached arm; a top end with a notch or recess, U-shaped or V-shaped; an array of through-bores downwardly spaced from the notch and also spaced along a length of the locking member, the through-bores being spaced so as to be alignable with the apertures of the respective attached arm; and a pair of connection pins or the like receivable in the pairs of apertures, each pin including at least one circumferential key member portion, a first of the pins joining the arms with the connection subassembly; wherein disposition of a second of the pins in a lower pair of cooperating apertures, at least one of the U-shaped notches matingly engages the at least one key member portion of the first pin. This simple structure of parts is but one example of the overall broad concept for a fail-safe release mechanism which is the basis for the invention.

In a first aspect of the third embodiment, when the U-shaped notch and the key member portion are engaged, the first pin in substantially non-removable. In a further aspect of the first aspect of the third embodiment, the locking member through-bores are substantially aligned with adjacent arm apertures.

In a second aspect of the third embodiment, removal of the second pin disengages the U-shaped notch from the first pin key member portion, such that the first pin in removable from the associated apertures.

In a third aspect of the third embodiment, each locking member includes a top through-bore that joins the inner and outer surfaces; a nut member; and a bolt that extends through the top through-bore and an adjacent aperture of the attached arm, so as to slidingly secure the locking member to the respective arm. In a further aspect of the third aspect of the third embodiment, the nut member engages the inner surface of the associated arm.

In a fourth aspect of the third embodiment, the second pin engages a connection member of the patient support, so as to hingeably attach the connection member to the base structure. In a further aspect of the fourth aspect of the third embodiment, the weight of a patient on the patient support substantially blocks removal of the second pin. In another further aspect of the fourth aspect of the third embodiment, the weight substantially blocks removal of the first pin.

In a fourth embodiment, a method of using a fail-safe release apparatus with a patient positioning support apparatus having a patient support structure removably hingeably attached to a base structure by a removable connection pin, the patient positioning support apparatus having a connection subassembly, which in this specific example includes a pair of longitudinally aligned spaced arms, each of the arms having inner and outer sides and an array of apertures extending between the inner and outer sides, the apertures being spaced along a length of the respective arm, each aperture of a first of the arms being paired with an opposed aperture of a second of the arms, the paired apertures cooperating so as to enable receipt of a connection pin through both of the cooperating opposed apertures, the received connection pin having an orientation transverse to a longitudinal axis of each of the arms is provided; the method including providing a pair of arms, each arm having a locking member attached to an outer side thereof; providing a pair of connection pins; inserting a first of the pins through an uppermost aperture of each of the arms and a through-bore of a rotation subassembly, so as to attach the arms to the rotation subassembly; inserting a second of the pins in a lower pair of cooperating arm apertures, wherein one of the apertures is located on each arm; and matingly engaging a U-shaped notch in at least one of the locking members with a key member portion of the first pin, thereby substantially blocking removal of the first pin. It is foreseen that other types of connection subassemblies and rotation subassemblies known in the industry could be used in this application.

In a fifth embodiment, an improved patient positioning support apparatus having a base detachably attached at both ends thereof to connecting subassemblies and an elongate patient support structure detachably attached at both ends thereof to the connecting subassemblies is provided, the improvement including a first release mechanism for the base and connecting subassembly attachment and a second release mechanism for the patient support structure and connecting subassembly attachment; wherein the second release mechanism must be released before the first release mechanism can be released.

In a sixth embodiment, an improved patient positioning support apparatus having a base and an elongate patient support structure detachably attached at both ends thereof to the base, the patient support structure having right-side up and upside-down orientations relative to the base is provided, the improvement including a release mechanism for the base and the patient support structure end attachments; wherein when the patient support structure is in the right-side up orientation relative to the upside down orientation, the release mechanism is at least one of more difficult to be released or impossible to be released.

In a seventh embodiment, a patient support apparatus is provided, the patient support apparatus including a base with a pair of spaced opposed vertically telescoping upright end supports; an elongate patient support structure with a pair of independent and spaced opposed hinges, and the opposed hinges being directly activated and moved by a force so as to cause the patient support structure to angulate into various orientations relative to a head end portion and a foot end portion connected by the pair of opposed hinges of the patient support structure; a first connection subassembly connecting the head end portion of the patient support structure to one of the upright supports near a top thereof or somewhere along a length thereof; and a second connection subassembly connecting the foot end portion of the patient support structure to the other of the upright supports near a top thereof or somewhere along a length thereof; wherein at least one connection subassembly cooperates with the upright end supports and the patient support structure to provide pitch, roll and yaw therebetween; and the upright end supports, the connecting subassemblies and the patient support structure cooperate to provide for a length adjustment therebetween so as to maintain and keep constant a distance separating the upright end supports when the upright end supports are independently raised and lowered vertically and the patient support structure is angulated by synchronized movement of the hinges when the hinges are directly activated by the force. It if foreseen that at least one of the pitch, roll and yaw could be incorporated within at least one of the base and the elongate patient support structure.

Spaced opposed hinges or joints on the patient support structure or frame provide for better imaging, such as with a C-arm, better abdominal fall-out for reduced blood loss during surgery and improved patient ventilation and breathing when in a prone position during general anesthesia.

The drawings constitute a part of this specification and include exemplary embodiments of the present invention and illustrate various objects and features thereof.

BRIEF DESCRIPTION OF THE DRAWINGS

FIG. 12 is an enlarged cross-sectional view of the of the fail-safe release mechanism of FIG. 2, the cross-section being taken along line 12-12 of FIG. 2.

DETAILED DESCRIPTION OF THE ILLUSTRATED EMBODIMENTS

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Definitions

In order to facilitate an understanding of the disclosed invention, a number of term are defined below.

The term "roll" as used herein is a broad term, and is to be given its ordinary and customary meaning to a person of ordinary skill in the art (and it is not to be limited to a special or customized meaning), and refers without limitation to rotation around a longitudinal axis, such as but not limited to revolving or turning over about, around or relative to a longitudinal axis. A longitudinal axis associated with roll may be referred to as a "roll axis" and is denote by the letter R, herein. In the accompanying FIGURES, rotational movement about a roll axis R is graphically denoted by a curved arrow, wherein the head of the arrow points toward the respective direction of the movement. By way of example, the exemplary patient positioning support apparati 4 and 5 shown in FIGS. 17 and 18, respectively, each include a single roll axis, denoted by the letter R, that extends longitudinally through the rotation assembly of each base subassembly, which are described below.

Figure 19:
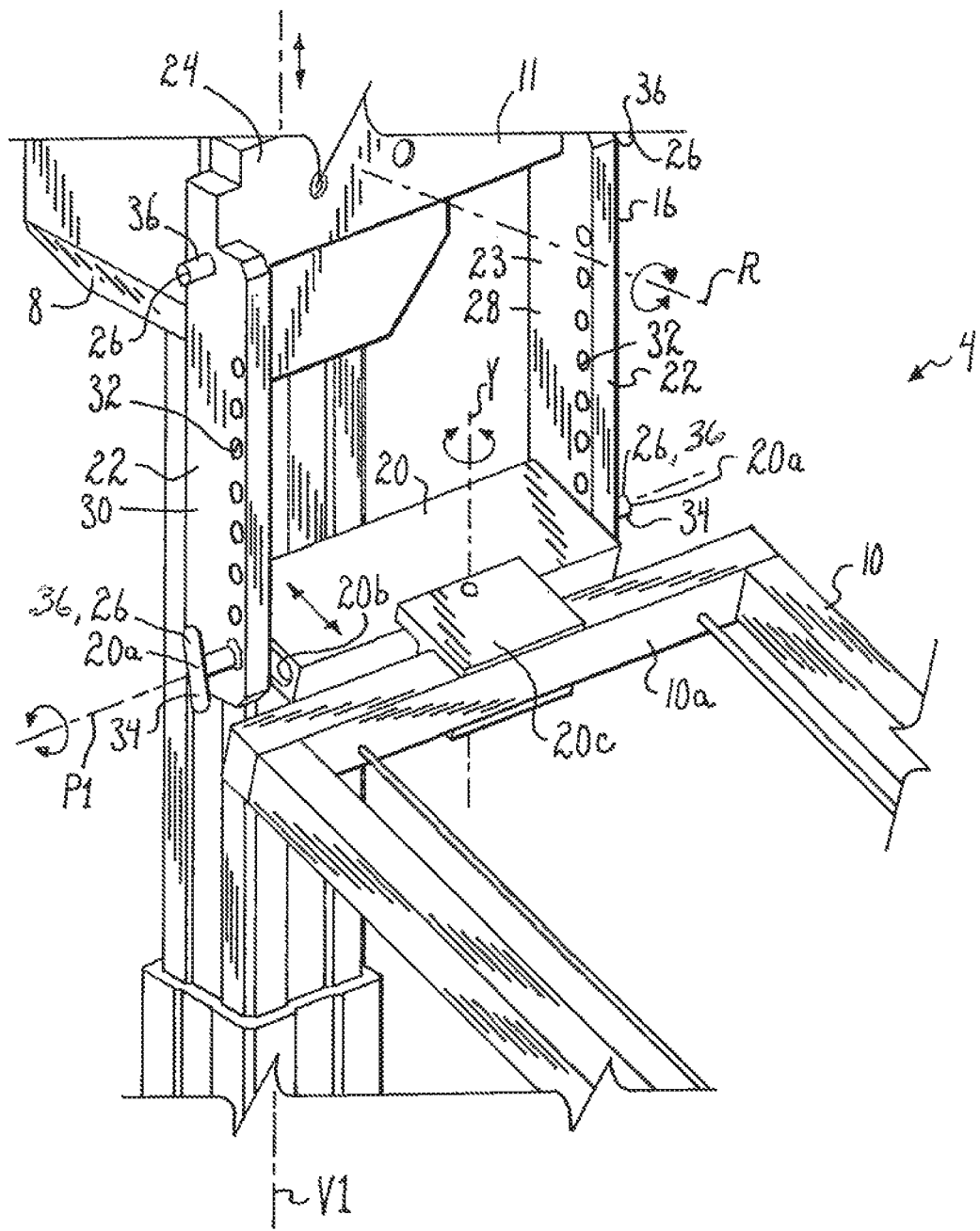
FIG. 19 is an enlarged view of a portion of the patient positioning support apparatus of FIG. 17.

The term "yaw" as used herein is a broad term, and is to be given its ordinary and customary meaning to a person of ordinary skill in the art (and it is not to be limited to a special or customized meaning), and refers without limitation to rotation around a vertical axis, such as but not limited to the twisting or oscillation around a vertical axis. A vertical axis associated with yaw may be referred to as a "yaw axis" and is denote by the letter Y, herein. In the accompanying FIGURES, rotational movement about a yaw axis Y is graphically denoted by a curved arrow, wherein the head of the arrow points toward the respective direction of the movement. For example, the yaw axis Y shown in FIG. 19 is coaxial with an attachment pin 20*b* that joins the patient support structure 10 with the bracket 20. In the illustrated embodiment, relative to the bracket 20, the patient support structure 10 is rotatable (at least a small amount) about this yaw axis Y.

The term "pitch" as used herein is a broad term, and is to be given its ordinary and customary meaning to a person of ordinary skill in the art (and it is not to be limited to a special or customized meaning), and refers without limitation to revolving or turning around a lateral axis. A lateral axis associated with pitch may be referred to as a "pitch axis" and is denote by the letter P, herein. For example, the exemplary patient positioning support apparatus 4, shown in FIGS. 17 and 19, includes first and second pitch axes $P_1$ and $P_2$, each of which is associated with a connection between the patient support structure 10 and a respective connection subassembly 11. This patient positioning support apparatus 4 also includes a third pitch axis $P_3$ associated with a breaking point of the patient support structure 10. This breaking point can be hinged or not. In another example, the exemplary patient positioning support apparatus 5 shown in FIG. 18 includes six pitch axes, which are denoted by $P_1$, $P_2$, $P_3$, $P_4$, $P_5$ and $P_6$, respectively. In the accompanying FIGURES, rotational movement about a pitch axis P is graphically denoted by a curved arrow, wherein the head of the arrow points toward the respective direction of the movement.

The term "translation" as used herein is a broad term, and is to be given its ordinary and customary meaning to a person of ordinary skill in the art (and it is not to be limited to a special or customized meaning), and refers without limitation to movement that changes the position of an object, as opposed to rotation. Translation occurs relative to one or more of the roll, yaw and pitch axes, R, Y and P, respectively, and generally is graphically denoted by a straight arrow, wherein the head of the arrow points toward the respective direction of the movement. For example, upward and downward vertical translation is graphically denoted herein by a straight double-headed arrow running parallel to and placed adjacent to the vertical axis (e.g., $V_1$ or $V_2$) along which the movement occurs. It is foreseen that the translation (length adjustment or translation compensation requirement) can be located in at least one of the table base and the patient support structure. It can be in the form of a bearing block mechanism, telescoping mechanism, sliding mechanism or other appropriate structure configured to provide for an overall change in length between the upright support structures of the base for the patient support structure and the associated subassembly connection mechanisms, wherein the upright end supports do not move along the floor relative to each other.

Overview

FIGS. 1-16 illustrate a fail-safe release mechanism, apparatus or device, generally denoted by the numeral 1, for use with a patient positioning support apparatus or surgical table. The fail-safe release mechanism 1 of the present invention is described in detail below, after a discussion of some exemplary patient positioning support apparati 4, 5 useful therewith.

Patient Positioning Support Apparati

Figure 17:
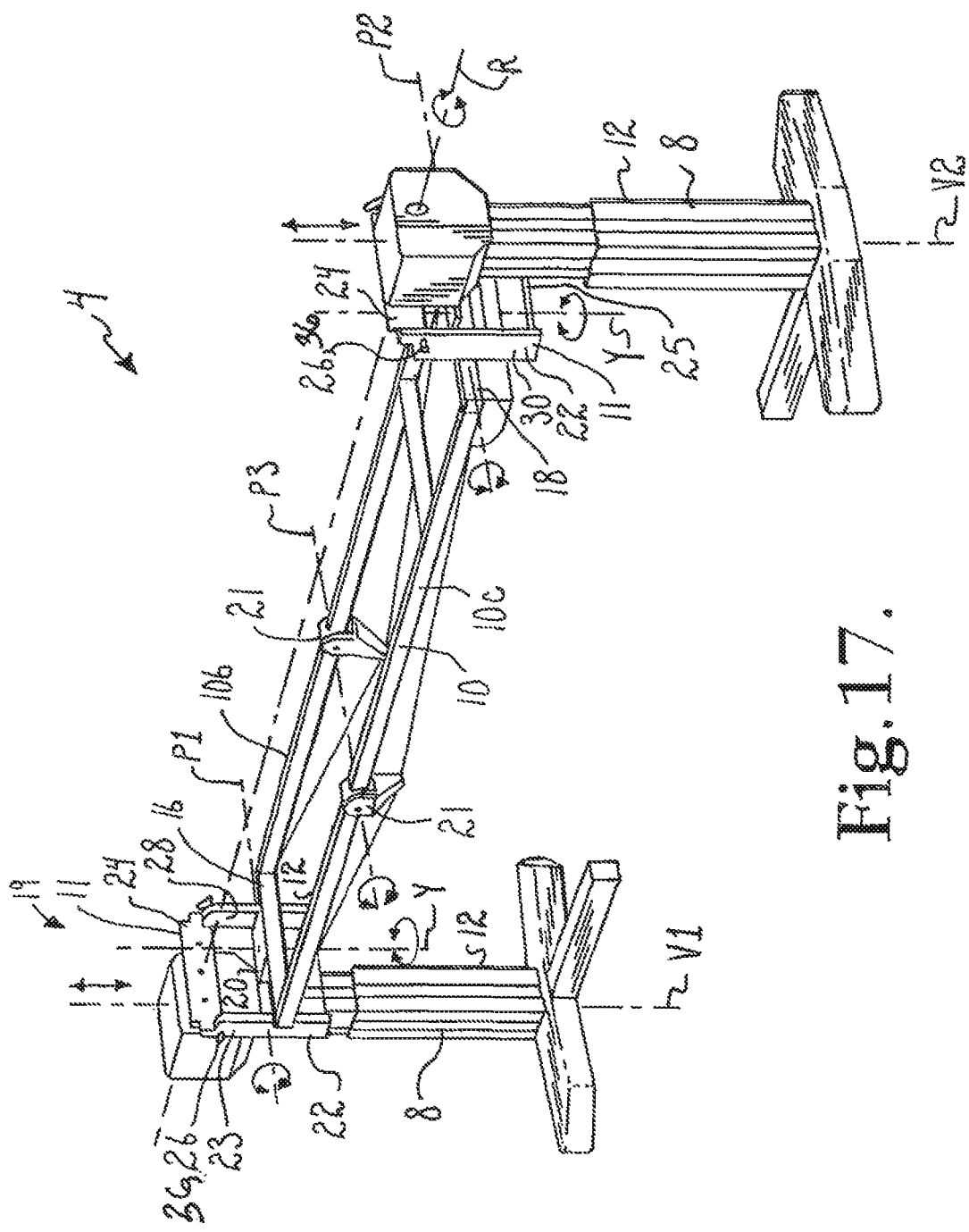
FIG. 17 is a perspective view of a patient positioning support apparatus usable with the fail-safe release mechanism of FIG. 1.
Figure 18:
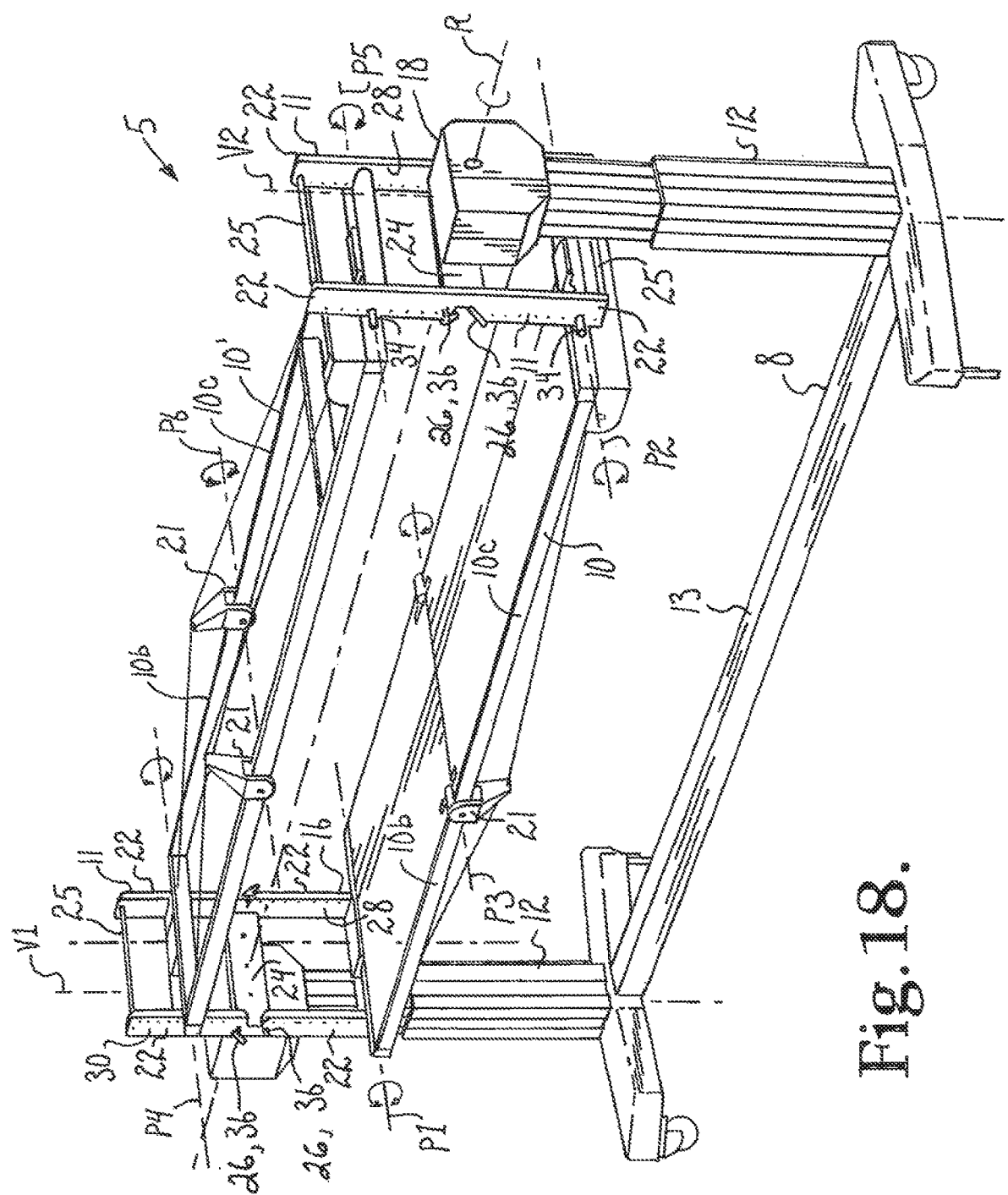
FIG. 18 is a perspective view of another patient positioning support apparatus usable with the fail-safe release mechanism of FIG. 1.

FIGS. 17-19 illustrate two exemplary patient positioning support apparati 4, 5 for use with the fail-safe release mechanism 1 of the present invention. Such patient positioning support apparati 4, 5 generally include a base structure 8 and a patient support structure 10, which are joined together at one or both ends of the patient support structure 10 by at least one connection subassembly 11. It is noted that the fail-safe release mechanism or apparatus 1 of the present invention may be utilized with alternatively configured and constructed patient positioning support apparati. Further, the various parts of the exemplary patient positioning support apparati 4, 5 may be mechanically linked and/or electronically synched, and either actively or passively driven in such alternatively configured and constructed patient positioning support apparati.

Base Structure

The base structure 8 includes a base subassembly 12, or upright end support, at one or both of its head and foot ends 16, 18, respectively. If the base structure 8 includes a single base subassembly 12, it is attached to either the head or foot end 16 or 18 of the patient support structure 10, and the opposed end of the patient support structure 10 is either cantilevered or attached to some other structure, such as but not limited to a wall, in the surgical suite. If the base structure 8 includes two base subassemblies 12, the base subassemblies 12 are generally spaced apart so as to be joinable with the opposed ends of the patient support structure 10.

In some circumstances, the base 8 includes a cross-bar 13 that joins or connects the base subassemblies 12 together. The cross-bar 13 may be either a single, stationary connection piece (shown in FIG. 18) or a multi-part, telescoping connection piece. Such actively driven or passively moved telescoping movement of the cross-bar can move the attached base subassemblies 12 closer together and further apart, such as to facilitate storage. It is foreseen that such a mechanism could be used for translation compensation associated with angulation of the patient support structure 10 at a centrally located pivot axis $P_3$.

Again, telescoping cross-bars 13 may be either actively driven or passive, depending upon the configuration of a given patient positioning support apparatus. Actively driven telescoping cross-bars 13 generally include a driver, such as but not limited to a motor, that actively drives or controls the inward and outward telescoping movement of the cross-bar pieces, such as it known in the art. Passive telescoping cross-bars telescope in response to other movement in the patient positioning support apparatus, such as but not limited to angulation at a pitch axis $P_n$. It is foreseen that angulation at a pitch axis $P_n$ may also be actively driven or passive, depending upon the configuration of a given patient positioning support apparatus, such as is discussed below in the section entitled "Patient Support Structure."

Alternatively, the base 8 may not include a cross-bar. For example, the base subassemblies 12 may be stand alone structures, such as is shown in FIG. 17. In some circumstances, such as the apparatus 4 shown in FIG. 17, one or both of the stand alone base subassemblies 12 are stationary, and do not move closer together or farther apart; and translation compensation is accomplished by another portion of the patient positioning support apparatus. In other circumstances, one or both of the stand alone base subassemblies 12 may include bottom castors, so as to enable passive movement of the base subassemblies 12, such as rolling closer together and farther apart, such as but not limited to in response to articulation at a hinge located at the central pivot axis $P_3$. The upright base subassemblies can be fixed to the floor.

Each of the base subassemblies 12 includes top and bottom ends, and a vertical axis $V_1$ and $V_2$, respectively. Such a vertical axis V may or may not be associated with a yaw axis Y. For example, in FIG. 19, the yaw axis Y is not associated with the vertical axis $V_1$.

Generally, a base subassembly 12 is either vertically stationary or vertically non-stationary, such as but not limited to telescoping. If the base subassembly 12 is vertically stationary, the top of base subassembly 12 cannot be raised and lowered. As a result, unless another portion of the patient positioning support apparatus 4, 5 includes a suitably adapted elevation subassembly, the height (e.g., relative to the floor) of an attached patient support structure end is generally unchangeable, or the height is set prior commencement of surgery and then stays the same throughout the surgical procedure.

On the other hand, if the base subassembly 12 is vertically movable, it generally includes an elevation subassembly adapted to actively drive vertical translation of the top of the base subassembly 12, with respect to the associated vertical axis $V_1$ or $V_2$. For example, the base subassemblies 12 shown in FIGS. 17-19 are configured to telescope vertically, and include an internal elevation subassembly with a cooperating lead screw and lead nut that are driven by a motor and controlled by electronics.

Each base subassembly 12 is attached to an end of the patient support structure 10, such that vertical translation of the top of a given base subassembly 12 is associated with vertical translation of the attached end of the patient support structure 10 in substantially the same direction and distance as the top end of the particular base subassembly 12.

Each attachment between a base subassembly 12 and an end of the patient support structure 10 includes or is associated with a pitch axis $P_n$. In some circumstances, vertical translation of a base subassembly 12 is associated with rotation of the attached patient support structure 10 about the pitch axis $P_n$. Such changes in pitch, such as but not limited to when only one end of the patient support structure 10 is vertically translated or when both ends are vertically translated at different rates and/or in opposite directions, can generate a change in the pitch or rotation of the patient support structure 10 relative to this base subassembly 12. Thus, by moving one or both ends of the patient support structure 10 in a suitable direction relative to the associated elevation axes $V_n$, the patient support structure 10 can be moved between a plurality of positions, relative to the floor of the surgical suite, such as but not limited to a position parallel to the floor and various Trendelenburg and reverse Trendelenburg positions.

As noted above, some patient positioning support apparati (not shown) that find use with the present invention include only a single base subassembly 12 located at one end of the patient support structure 10. When there is a base subassembly 12 at only one end of the patient support structure, the opposed end is either cantilevered or attached to a wall or to another structure in the surgical suite. Further, some patient positioning support apparati include at least one interchangeable base subassembly 12 that can be swapped out with another base subassembly 12. For example, a non-telescoping base subassembly 12 may be substituted or exchanged with a telescoping base subassembly 12, and vice versa.

Some base subassemblies 12 include a rotation subassembly, generally 19, associated with a roll axis R, for rolling, tilting or rotating the patient support structure 10 relative to the roll axis R. Inclusion of a rotation subassembly 19 enables tilting the patient support structure 10 to either side of the roll axis R, or from side to side, a distance of up to approximately ±5°, ±10°, ±15° or ±20°. In some circumstances, the rotation subassembly 19 is adapted to roll the patient support structure 10 a distance of up to about ±180° and preferably up to approximately ±360° about the rotation axis R. Rolling at least ±180° enables turning a patient, on the patient support structure 10, over from a prone position to a supine position, and vice versa, and facilitates transfer of the patient to and from the patient support structure 10. This is useful for performing what is commonly known as a "sandwich and roll" procedure, which is described below. It is noted that, additionally or alternatively, all or part of the rotation subassembly 19 may be incorporated into at least one of the connection subassembly 11 and the patient support structure 10, as well as in the base upright subassembly or subassemblies.

Patient Support Structure

The patient support structure 10 is sized, shaped and configured to support a patient on the patient positioning support apparatus 4, 5. Accordingly, the patient support structure 10 is attached to at least one base subassembly 12 by an intervening connection subassembly 11. The patient support structure 10 is selected from a variety of structures known in the art, such as but not limited to an open patient support frame, a closed surgical table top, an imaging table top, and an orthopedic trauma or fracture table top, which may be interchangeable with one another.

The patient support structure 10 generally includes an attachment structure at one or both ends, for attachment to the connection subassembly 11. An exemplary connection subassembly-patient support structure attachment is shown in FIG. 19. Namely, the patient support structure 10 includes a bracket 20 that reversibly and slidingly engages an elongate pin 20a, which in turn is reversibly and frictionally engaged by the connection subassembly 11. In addition to brackets 20, other suitable attachment structures include but are not limited to a variety hooks (not shown).

The bracket 20 is sized, shaped and configured enable at least some movement of the patient support structure 10 relative to the base structure 8. In particular, the bracket 20 includes a transverse rectangular through-slot 20b that slidingly engages the pin 26. As shown in FIG. 19, the pin 26 is coaxial with the pitch axis $P_1$. The rectangular through-slot 20b is sized and shaped such that the bracket 20 can rotate around the pin 26, as is denoted by the curved double-headed arrow that extends about the pitch axis $P_1$. Additionally, the through-slot 20b is sized and shaped such that the bracket 20 can translate, or slide, toward and away from the adjacent base subassembly 12, as is denoted by the straight double-headed arrow pointing toward and away from the base subassembly 12. In this particular configuration, this angulation and translation of the bracket 20 about the pin 20b are passive, and occur as a result of translation or rotation elsewhere in the patient positioning support apparatus 4, 5. In other circumstances, such angulation and/or translation associated with the attachment of the connection subassembly 12 and the patient support 10, or with the bracket 20, is actively driven, or non-passive, such as but not limited to by inclusion of a motorized driver, such as is described elsewhere herein. It is foreseen that an attachment between the patient support 10 and the connection subassembly 11 may be configured so as to disallow or block at least one of angulation and translation. The block could also be in the base, such as at the top of at least one of the upright subassemblies.

It is foreseen that the attachment between the patient support structure 10 and the connection subassembly 11 may include an angulation structure that enables angulation about an associated yaw axis Y. For example, with reference to FIG. 19, the bracket 20 includes a pin 20c that joins the frame 10a with the bracket 20. The pin 20c is coaxial with the yaw axis Y and is adapted to accommodate yaw of the patient support structure 10 relative to the base structure 8. This angulation about the yaw axis Y is associated with various combinations of translation and articulation the patient support structure 10 relative to the base structure 8, such as is described elsewhere herein and is known in the art.

Some patient support structures (not shown) include a single non-breaking portion engaging both of the connection subassemblies 11. Such "fixed" frame or patient support structures cannot angulate or bend.

Other patient support structures 10, such as but not limited to those shown in FIGS. 17 and 18, include at least two portions, such as but not limited to a head portion 10b and a foot end portion 10c, which can be angulated relative to one another, such as about an additional pitch axis $P_3$. Some patient support structures 10 include an angulation structure that enables angulation, articulation or breaking of the patient support structure 10 about a centrally located pitch axis $P_3$. Suitable angulation structures include but are not limited to a hinge 21, a pair of opposed hinges 21, and similar structures. Generally, such hinges 21 are located mid-way between the head and foot ends 16, 18 of the patient support structure 10, such that, when a patient is on the patient support structure 10, the pitch axis $P_3$ is located near the patient's hips, and angulation at $P_3$ is associated with bending the patient's hips. It is foreseen that the patient support structure 10 may include additional angulation structures that are located so as to be associated with the patient's knees or neck.

In some circumstances, the two portions, of the patient support structure 10, are joined together at their inboard ends by an angulation structure, such as is known in the art. For example, the head and foot end portions 10b and 10c are joined together by a pair of hinges 21 associated with the central pitch axis $P_3$. The hinges 21, depending upon the configuration of the patient positioning support apparatus 4, 5, may be either actively driven or passive. Actively driven hinges 21 are generally driven by an actuation device or driver, such as but not limited to a motor (not shown). On the other hand, passive angulation of the hinges 21 generally occurs due to at least one of angulation and translation of other portions of the patient positioning support apparatus 4, 5, such as but not limited to the outboard ends of the patient support structure 10. In still other circumstances, the head and foot portions 10b and 10c are disconnected, or not joined, at their inboard ends (not shown), such that angulation at the pitch axis $P_3$ occurs passively, in response to actively driven angulation at their outboard ends, such as about axes $P_1$ and $P_2$. In this case, the connection subassemblies use some type of cantilever lifting mechanism to move the hinges.

It is known that angulation of the patient support structure 10 at the central pitch axis $P_3$ modifies the distance between the outboard ends of the patient support structure 10. Accordingly, patient positioning support apparati 4, 5 that include an angulatable patient support structure 10 generally also include at least one translation subassembly (not shown), or translation compensation subassembly, to compensate for such distance changes and to prevent stretching the patient's body. For example, translation compensation can be provided by a telescoping base cross-bar 13 that moves the base subassemblies 12 parallel to the roll axis R, depending upon the direction and amount of angulation about the central pitch axis $P_3$. In another example, shown in FIG. 19, translation compensation (denoted by the straight double-headed arrow at the bracket 20) is provided by the bracket 20 including an elongate slot 20b through-which pin 26 is received, and allows the bracket 20 to slide back and forth about the pin 26, such as in response to an amount of angulation at the central pitch axis $P_3$ (see FIG. 17). Slider bar mechanisms, articulating components and telescoping mechanisms are now becoming the preferred structure for the table translation compensation.

Connection Subassembly

The connection subassembly 11 reversibly joins, attaches or secures the patient support structure 10 with the base structure 8, at one or both outboard ends of the patient support structure 10. For example, the patient positioning support apparati 4, 5, shown in FIGS. 17-19, include a connection subassembly 11 at each of the head and foot ends 16 and 18 that attach the outboard ends of the patient support structure 10 to respective head and foot end base subassemblies 12. Other patient positioning support apparati (not shown) include only a single base subassembly 12, and so they require only one connection subassembly 11. Again, the connection subassemblies 11 can be actively or passively moved structures, including activated cantilever-like lifting mechanisms.

It is noted that the structure of the fail-safe release mechanism 1 described herein is adapted to cooperate with the structure of the exemplary connection subassembly 11. Again, it is foreseen that other patient positioning support apparati may have alternatively configured connection subassemblies 11, like that described above. Accordingly, in such circumstances, the fail-safe release mechanism 1 is configured to function cooperatively with the alternatively configured connection subassembly 11, so as to perform the functions of the first and second interlock portions described herein.

Figure 1:
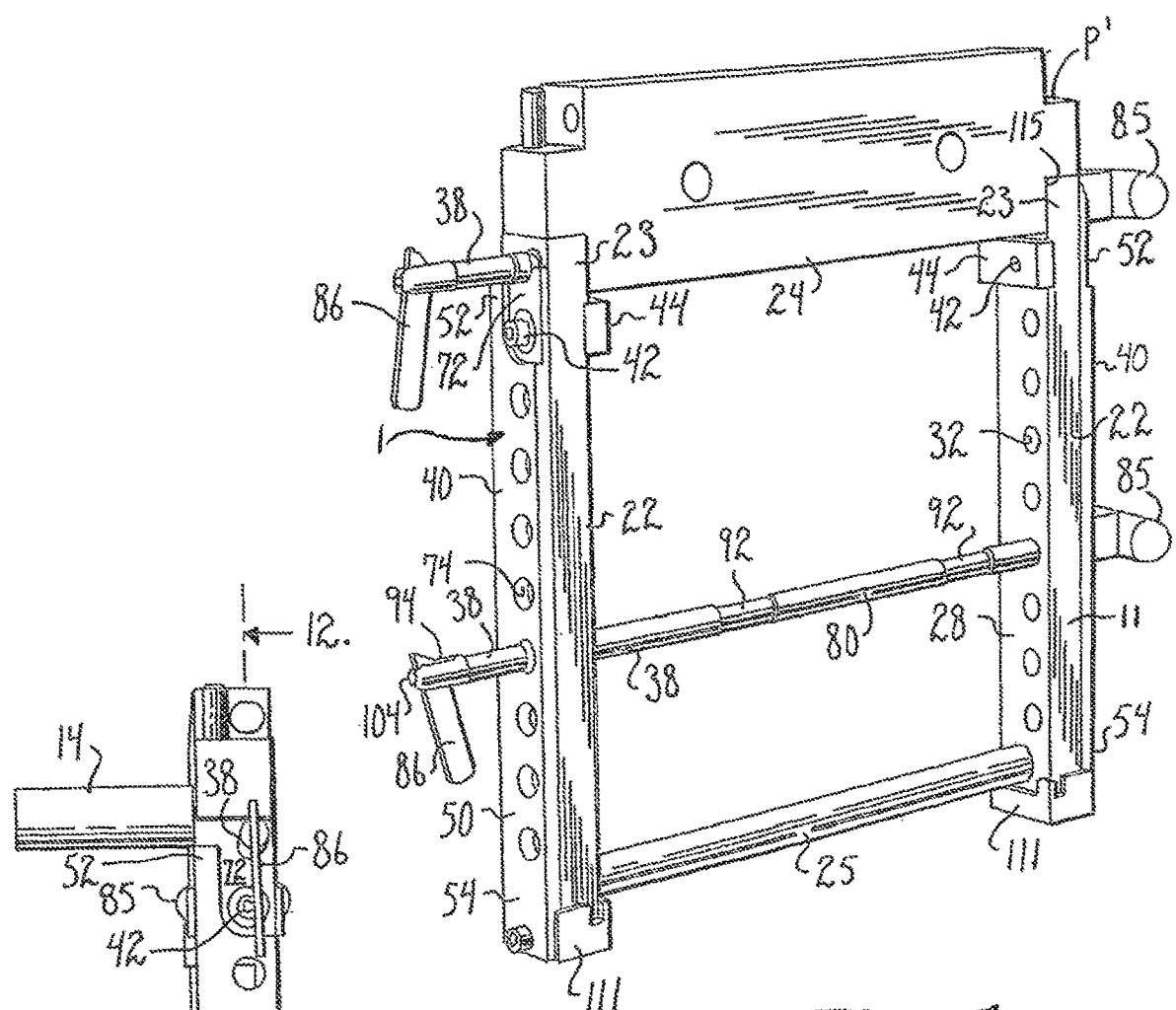
FIG. 1 is a front perspective view of an exemplary embodiment of the fail-safe release mechanism of the present invention. The exemplary fail-safe release mechanism is attached to an exemplary connection subassembly of a patient positioning support apparatus, and includes first and second interlocks having a pair of locking members and a pair of locking rods.
Figure 2:
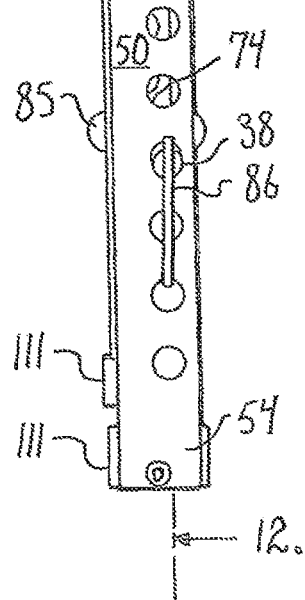
FIG. 2 is a side view of the fail-safe release mechanism of FIG. 1.
Figure 3:
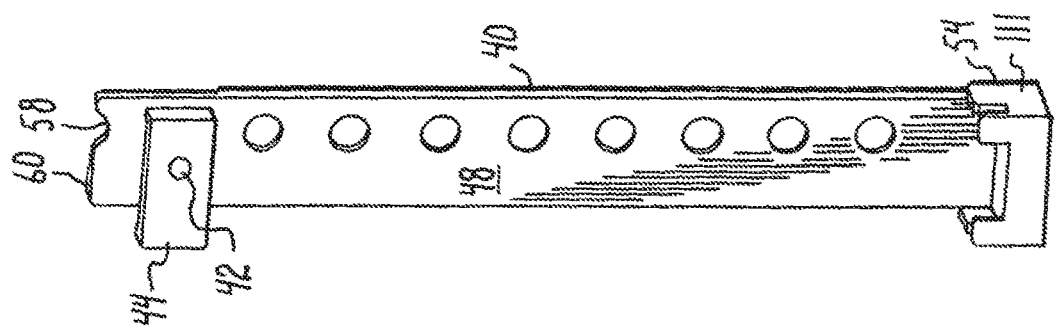
FIG. 3 is an enlarged side perspective view of the outer side of a first locking member of the fail-safe release mechanism of FIG. 1.
Figure 4:
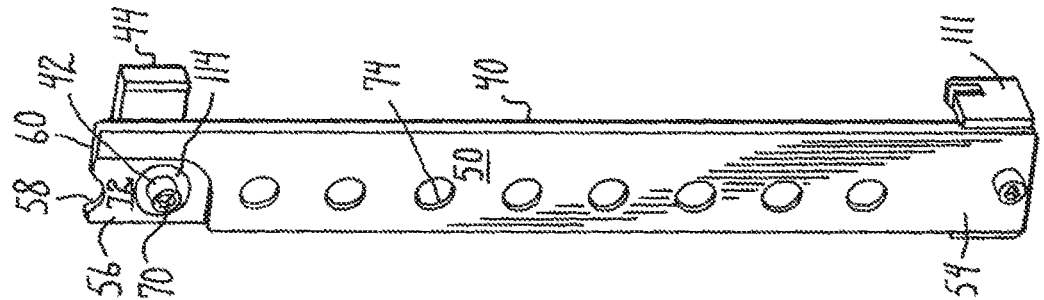
FIG. 4 is a perspective view of the inner side of the first locking member of FIG. 3.
Figure 5:
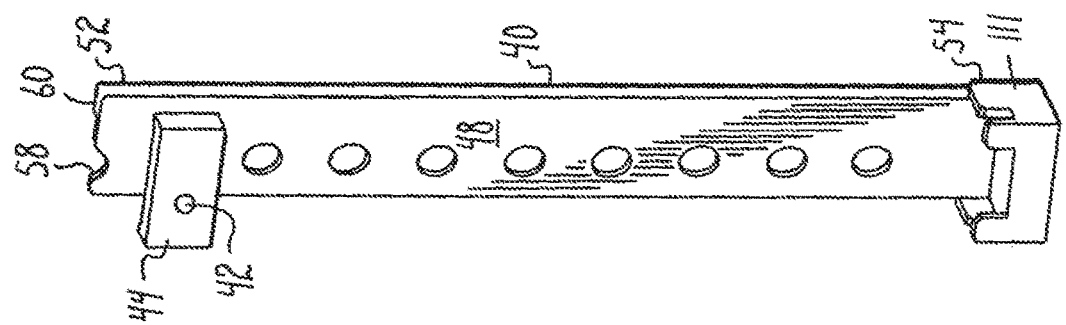
FIG. 5 is an enlarged side perspective view of the outer side of a second locking member of the fail-safe release mechanism of FIG. 1.
Figure 6:
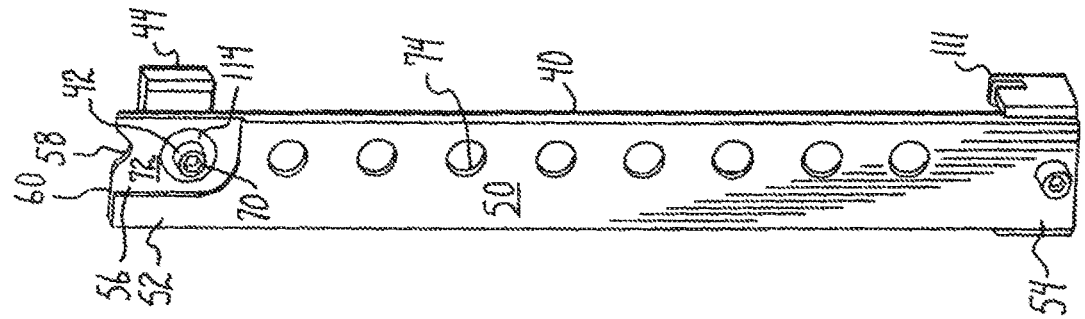
FIG. 6 is a perspective view of the inner side of the second locking member of FIG. 5.

The configuration of the connection subassembly 11 depends upon the configuration of the patient positioning support apparatus 4, 5 with which it is to cooperatively function. FIGS. 1, 2 and 12 illustrate an exemplary connection subassembly 11 for use with the exemplary patient positioning support apparati, such as but not limited to the patient positioning support apparati 4 and 5 shown in FIGS. 17-19. Alternatively configured connection subassemblies 11 are foreseen, wherein some are detachable and others are not detachable.

Each connection subassembly 11 is sized, shaped, arranged and configured to cooperate with the attached base and patient support structures 8, 10, so as to provide for, allow or enable changes in the pitch, roll and yaw of the patient support structure 10 relative to the base structure 8. Again, such a connection subassembly 11 may be non-removable, partially removable or wholly removable. In some circumstances, at least a portion of at least one additional connection subassembly 11 is addable to the assembly 4, 5.

The exemplary connection subassembly 11 includes a pair of longitudinally aligned, downwardly extending arms 22 that are spaced a distance suitably for being reversibly attached to, secured to, or engaged with at least one of the base structure 8 and the patient support subassembly 10. For example, at their upper ends 23, the arms 22 are reversibly joined to a rotator member 24 by a connection pin 26. At their lower ends, the arms 22 are reversibly joinable with, or form a reversible attachment with, the patient support structure 10 by another connection pin 26.

At their lower ends, the arms 22 may also be joined by an intervening portion, such as a metal bar or spacer 25, so as to form a substantially rigid, frame-like structure. However, this may not be the case in other connection subassembly configurations. It is foreseen that the rotation subassembly 19, of some patient positioning support apparati 4, 5 may include at least part of the connection subassembly 11 or vice versa.

Referring now to FIG. 12, each arm 22 includes a longitudinal axis A, inner and outer sides 28 and 30, respectively, and an array of apertures 32, holes or bores extending substantially perpendicular to the axis A so as to join the sides 28, 30. The apertures 32 are sized so as to enable passage of a connection pin 26 therethrough. For example, a diameter of the apertures 32 may be substantially equal to or slightly greater than a diameter of the widest cross-section of the connection pin 26, wherein the cross-section is take substantially perpendicular to a longitudinal axis of the pin 26. While the illustrated apertures 32 are spaced substantially evenly along the length of each arm 22, it is foreseen that there may be more or fewer apertures 32 than depicted, and at least some of the apertures 32 may be spaced unevenly.

Each aperture 32 of a first of the arms 22 is axially aligned with an opposed aperture 32 of a second of the arms 22, so as to form pairs of opposed apertures 32'. For example, as shown in FIG. 12, axis E passes through the axial center of both of the apertures 32', which constitute a pair of opposed apertures 32'. The apertures of an opposed pair 32' cooperate so as to enable both of the apertures 32' to sequentially slidingly receive therethrough and engage the connection pin 26. The connection pin 26 received through the pair of apertures 32' is coaxial with axis E and substantially perpendicular to the arm longitudinal axes A. As is discussed below, the fail-safe release mechanism 1 includes at least two key members, or locking rods, that replace the connection pins 26. These key members are described below in the sections entitled "Fail-Safe Release Mechanism" and "Methods of Use."

Either prior to or during a surgical procedure, a second pair of arms 22 can be attached to the rotator 24 at points P and P' (see FIGS. 1 and 18), such that a second patient support structure 10' can be attached to the patient positioning support apparatus 4, 5. For example, the patient positioning support apparatus 5 of FIG. 18 includes a first patient support structure 10 (e.g., a table top) that is shown in a lower or right-side up configuration or position, and a second patient support structure 10' (e.g., a frame) that is shown in an upper or upside-down configuration or position.

A second patient support structure 10' is useful for a variety of procedures. For example, a second patient support structure 10' may be used to perform a "sandwich and roll" procedure, so as to transfer a patient from a bed to a surgical table while simultaneously moving the patient from a supine position to a prone position on the surgical table. During a sandwich and roll procedure, the connection subassembly 11 is rotate approximately ±180° at the roll axis R, such that the second patient support structure 10' is placed in placed in the lower position and is right-side up, and the first patient support structure 10 is placed in the upper position and is upside-down. It is foreseen that alternative connection structures can be attached to the connection subassembly 11, to attach the second patient support structure 10' to the patient positioning support apparatus 4, 5.

In another example, the second patient support structure 10' is an imaging table top attached to the patient positioning support apparatus 4, 5 before or during a surgical procedure, so as to take an X-ray image of the patient.

Each of the patient support structures 10, 10' are disconnectable or detachable from the base structure 8. This detachment is accomplished in two steps. In a first step, the pins 26 joining the patient support structure to connection subassemblies 11 (e.g., at the head and foot ends 16, 18 of the patient support structure 10, 10') are removed. The released patient support structure 10, 10' may then be placed aside. In a second step, the pins 26 joining the head and foot end connection subassemblies 11 with the respective base subassemblies 12 are removed. For example, in the illustrated embodiment, the arms 22 are disconnected from the rotator members 24.

Improper pin 26 removal, due to worker error, can lead to patient injury. Namely, it is well known that operating rooms are busy places and operating room staff may be rushed. Under such working conditions, the pins 26 can appear or look very similar. If the staff person disconnecting the pins 26 does not stop and pay attention to what they are doing, they may accidentally remove the pins 26 in the wrong order, thereby causing an upper patient support structure 10 or 10' to collapse onto a patient on a lower patient support structure 10' or 10. To prevent this problem, existing patient positioning support apparati, such as but not limited to apparati 4 and 5, can be retrofitted with a fail-safe release mechanism 1 of the present invention, which is described in the section entitled "Fail-Safe Release Mechanism." Such retrofitting includes converting the attachment between the base subassembly 12 (e.g., the rotator member 24) and the connection subassembly 11 (e.g., the arms 22) to a first interlock portion, and converting the attachment between the connection subassembly 11 (e.g., arms 22) and the patient support structure 10 to a second interlock. The first and second interlock portions, which form the interlock of the fail-safe release mechanism 1, are described below.

Newly manufactured patient positioning support apparati, whether or not they have a structure the same or similar to the exemplary apparati 4 and 5, can be fabricated so as to include the first and second interlock portions of the fail-safe release mechanism 1, thereby not requiring retrofitting.

Numerous configurations of the patient positioning support apparatus 4, 5 are foreseen. Additional suitable surgical tables for use in conjunction with aspects of the preferred embodiments are disclosed in U.S. Pat. Nos. 7,152,261, 7,343,635, 7,565,708 and 7,739,762, and U.S. Publication Nos. 2009-0282614, 2011-0107517, 2011-0099716, 2011-017516, and 2012-0023672, all of which are incorporated by reference herein in their entirety.

Fail-Safe Release Mechanism

As noted above, the attachments between the base 8 and the connection subassemblies 11 and between the connection subassemblies 11 and the patient support structure 10 can be adapted or converted to include a fail-safe release mechanism 1 of the present invention, such as but not limited to as described below. Similarly, newly manufactured patient positioning support structures can be manufactured so as to include fail-safe release mechanism 1 of the present invention, and therefore not require such conversion. It is noted that FIGS. 1-16 illustrate one exemplary embodiment of the fail-safe release mechanism 1 of the present invention. Fail-safe release mechanisms 1 having alternative structures and configurations are foreseen.

Referring now to FIGS. 1-16, the exemplary fail-safe release mechanism 1 includes an interlock with first and second interlock portions. Each of the first and second interlock portions is reversibly actuatable, reversibly engageable, or movable between actuated and de-actuated configurations. Further, the first and second interlock portions are sized, shaped and configured to cooperate such that the first interlock portion cannot be deactivated, disengaged, disassembled, disconnected or turned off until the second interlock portion has been deactivated, disengaged, disassembled, disconnected or turned off. Accordingly, actuation of the second interlock portion substantially blocks de-actuation of the first interlock portion.

The first interlock portion includes an attachment between the base structure 8, the connection subassembly 11 and an upper key member 38, wherein the pin 36 seen in FIGS. 17-19 has been replaced with a key member 38. This first attachment is also referred to herein as either a first attachment or a base structure-to-connection subassembly attachment. The second interlock portion is similar to the first interlock portion, and includes an attachment between the connection subassembly 11, the patient support structure 10 and a lower key member 38, wherein the pin 38 seen in FIGS. 17-19 has also been replaced with a key member 38. This second attachment is also referred to herein as either a second attachment or a connection subassembly-to-patient support structure attachment.

The first and second interlock portions cooperate with one another such that, when the second interlock portion is in an actuated configuration, the first interlock portion substantially cannot be placed or moved to a de-actuated configuration. For example, formation or maintenance of the second attachment substantially blocks disassembly of the first attachment. In another example, with reference to an exemplary patient positioning support apparati 4, 5, when the connection pins 34, 36 are replaced with key members 38, the lower key member 38 substantially blocks removal of the upper key member 38.

In some embodiments, the first and second interlock portions are fabricated, either wholly or in part, of mechanical structures and are mechanically linked, or interconnected, so as to enable cooperation therebetween, so that actuation of the second interlock portion substantially blocks de-actuation of the first interlock portion. Further, in some embodiments, the first interlock portion is reversibly actuatable when the second interlock portion is de-actuated, such as, for example, the lower key member 38 substantially blocking removal of the upper key member 38, described above and in greater detail below.

In some embodiments, the first and second interlock portions are electronically synched so that actuation of the second interlock portion substantially blocks de-actuation of the first interlock portion. Further, in some embodiments, de-actuation of the second interlock portion enables, or allows, reversible actuation of the first interlock portion. In these embodiments, one or both of the first and second interlock portions are fabricated at least partially of electronic components, such as but not limited to electronic switches, controllers and actuators.

It is foreseen that in certain embodiments, one or more mechanical structures of the fail-safe release mechanism 1 or of the patient positioning support apparatus 4, 5 is replaceable with a functionally equivalent electronic component. Accordingly, in some embodiments, the first and second interlock portions are a hybrid of mechanical and electronic components that are interconnected, linked or synchronized with each other.

Each of the first and second interlock portions includes at least one of an attachment structure, a locking structure and an actuation structure.

As used herein, the term "attachment structure" refers to a structure that participates in formation of an attachment between two or more structures or elements of the patient positioning support apparatus 4, 5. Exemplary attachment structures include but are not limited to rods, pins, bolts, latches, through-bores and apertures in one or more of the base structure 8, the connection subassembly 11 and the patient support structure 10. It is foreseen that, in some embodiments, an electronic attachment structure is substitutable for a mechanical attachment structure. Attachment structures can be "robotic" in nature and pre-programmed to work in some applications.

As used herein, the term "locking structure" refers to a multi-part assembly or structure comprised of lock and key portions, structures or members that engage and cooperate with one another to perform a locking function. A locking structure is a mechanical or electronic structure or component that contributes to the functional locking of at least one of the first and second interlock portions. For example, in some circumstances, a through-bore and a rod received therethrough are lock and key portions, respectively.

As used herein, the term "actuation structure" refers to any structure of the fail-safe release mechanism 1 that is useable to actuate one or both of the first and second interlock portions.

Referring now to FIGS. 1-16, the fail-safe release mechanism 1 of the present invention includes a pair of locking members 40, also referred to herein as side members or side plates, a pair of bolts 42, a pair of nut members 44, and a pair of key members 38 or locking rods. The bolts 42 and nut members 44 cooperate to attach the locking members 40 to the arms 22. The key members 38 replace the pins 34, 36 of the exemplary patient positioning support apparati 4, 5.

As is most easily seen in FIGS. 3-6, the individual locking members 40, of a pair of locking members 40, are mirror images of each other, and include an inner surface 48, an outer surface 50, and upper and lower (or top and bottom) ends 52, 54, respectively. Each locking member 40 is slidingly attached to the outer side 30 of an arm 22. Accordingly, the inner surfaces 48 of the locking members 40 slidingly engage the outer surfaces 30 of the respectively attached arms 22, such as is shown in FIG. 1. Each of the locking members 40 can be moved downwardly with respect to the respectively attached arm 22, to a first position shown in FIGS. 8-9, and upwardly with respect to the respectively attached arm 22, to a second position shown in FIGS. 1, 2, 10-14.

Figure 13:
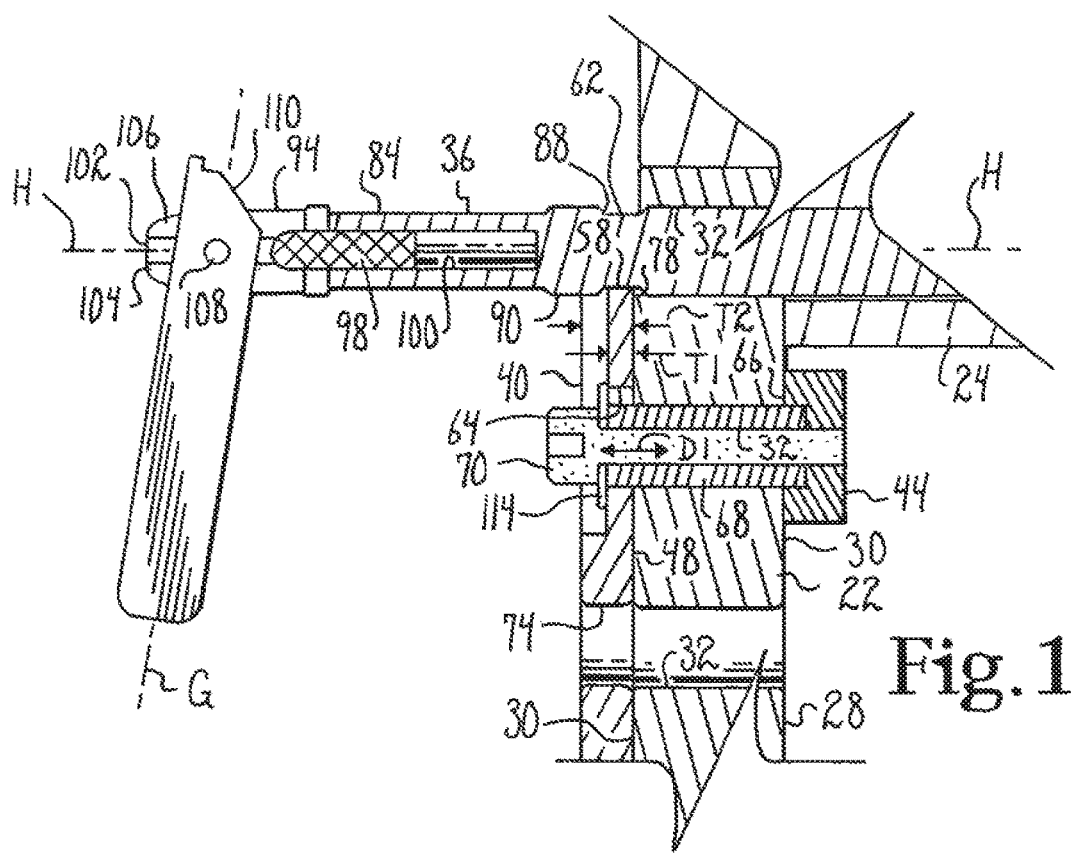
FIG. 13 is an enlarged view of an upper left-hand portion of the fail-safe release mechanism of FIG. 12.

At its upper end 52, each locking member 40 includes a cut-out portion 56 with a substantially planar face 57. As is most easily seen in FIG. 13, the cut-out portion 56 includes a thickness T1, which is equal to about half of the thickness T2 of the locking member 40. A U-shaped notch 58 is cut into the cut-out portion 56, at the top surface 60 of the locking member 40, such that the U-shaped notch 58 also has a thickness of T1. As will be described in greater detail below, and shown in FIG. 13, the U-shaped notch 58 is sized, shaped and located so as to be engageable with a key notch portion 62 on a key member 38 received through the top-most aperture 32 of the attached arm 22. As shown in FIG. 13, the thickness T1 of the cut-out portion 56, and also of the U-shaped notch 58, is substantially equal to a width of the key notch portion 62.

An oblong through-bore 64 is located in the cut-out portion 56 and joins the inner and outer surfaces 48, 50 of the locking member 40. Though the exemplary oblong through-bore 64 of the illustrated embodiment is ovular in shape, other oblong or non-oblong shapes are foreseen, such as but not limited to circular, rectangular, and rectangular with rounded corners. The oblong through-bore 64 is spaced downwardly from the U-shaped notch 58 a distance sufficient to enable insertion of a bolt 42 therethrough. The bolt 42 is also inserted through an attached arm aperture 32 that is located adjacent to the oblong through-bore 64. In the illustrated embodiment, the aperture 32 that receives the bolt 42 is adjacent to and spaced downwardly from the top-most aperture 32. At the arm inner side 28, the bolt 42 is cooperatively engaged by or attached to a nut member 44, so as to slidingly secure the locking member 40 to the respective arm 22. As shown in FIG. 13, an inner surface 66 of the nut member 44 frictionally engages the arm inner surface 28.

In the illustrated embodiment, a bushing 68 spaces the head 70 of the bolt 42 a distance D1 from the surface 72 of the cut-out portion 56, wherein D1 is substantially equal to T1. Since D1 is substantially equal to T1, upward and downward sliding of the locking member 40 with respect to the arm outer surface 30 is enabled. In particular, the locking member 40 is slidable between first and second positions, wherein the first position is associated with the locking member 40 being slid maximally downward with respect to the arm 22, and the second position is associated with the locking emmer 40 being slid maximally upward with respect to the arm 22. It is foreseen that, in some embodiments, the bolt 42 and the bushing 68 is inserted through another of the arm apertures 32. Further, in some embodiments, the oblong through-bore 64 is located farther downward on the locking member 40, such that one or more through-bores 74 is located between the oblong through-bore and the U-shaped notch 58. Alternatively, in some embodiments, no bushing 68 is included.

Figure 9:
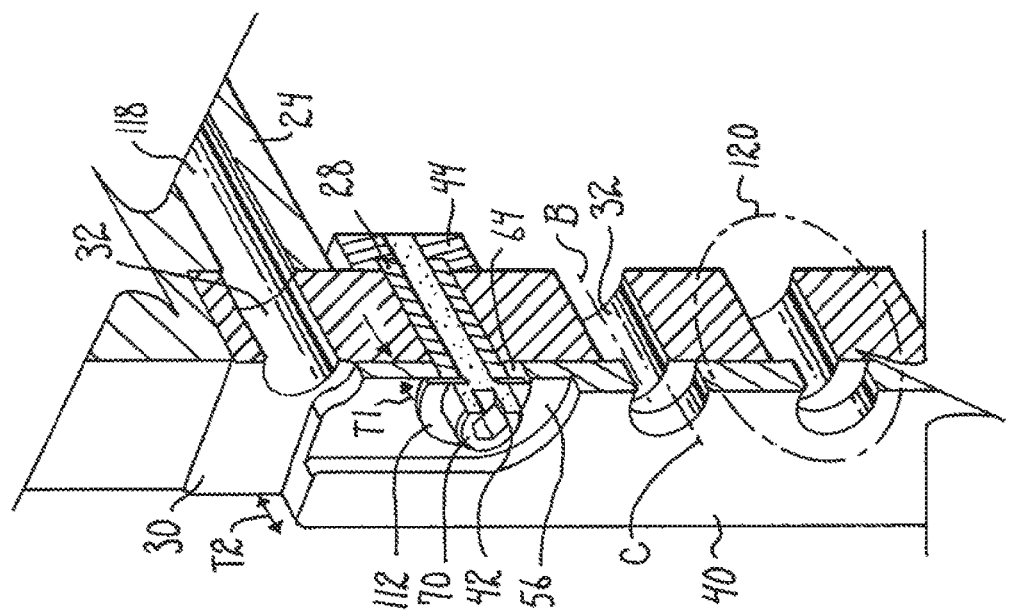
FIG. 9 is a cross-section of the fail-safe release mechanism of FIG. 8, showing greater detail thereof, the cross-section being taken on line 9-9 of FIG. 8.
Figure 8:
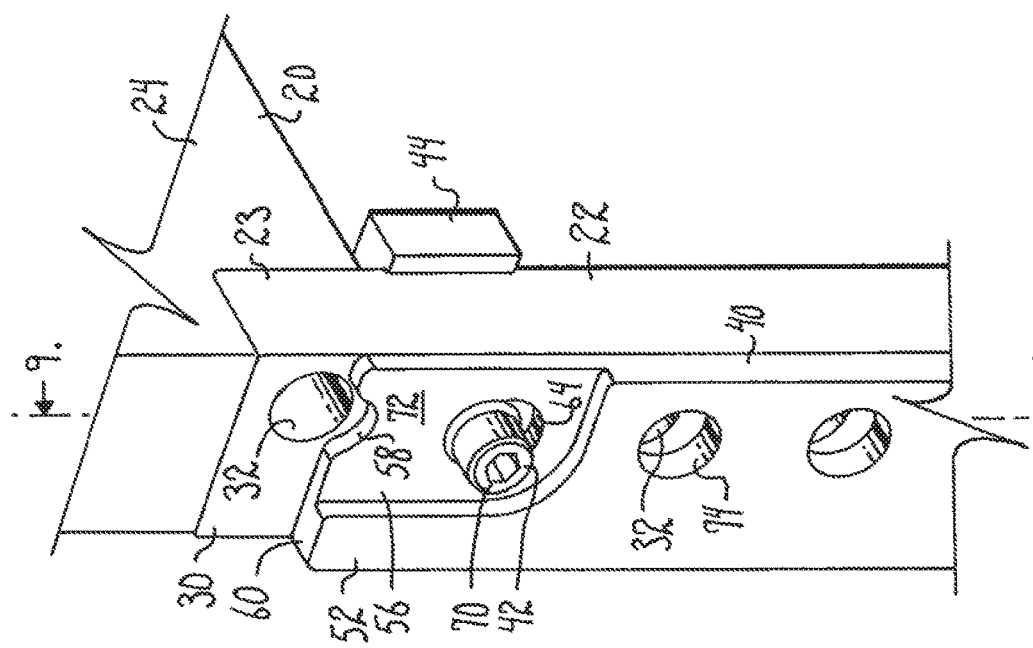
FIG. 8 is a perspective view of the upper portion of the locking member of FIG. 7, including portions of the connection subassembly, to show greater detail of the position of the locking member U-shaped notch with respect to the arm upper aperture when no locking rod is present (no locking rod not shown) and the locking member through-bores are misaligned with the arm apertures.
Figure 7:
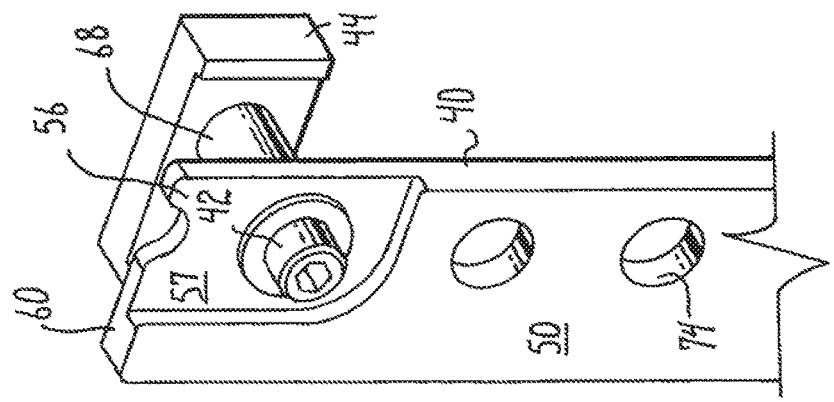
FIG. 7 is an enlarged perspective view of an upper portion of the locking member of FIG. 3, showing greater detail thereof.
Figure 11:
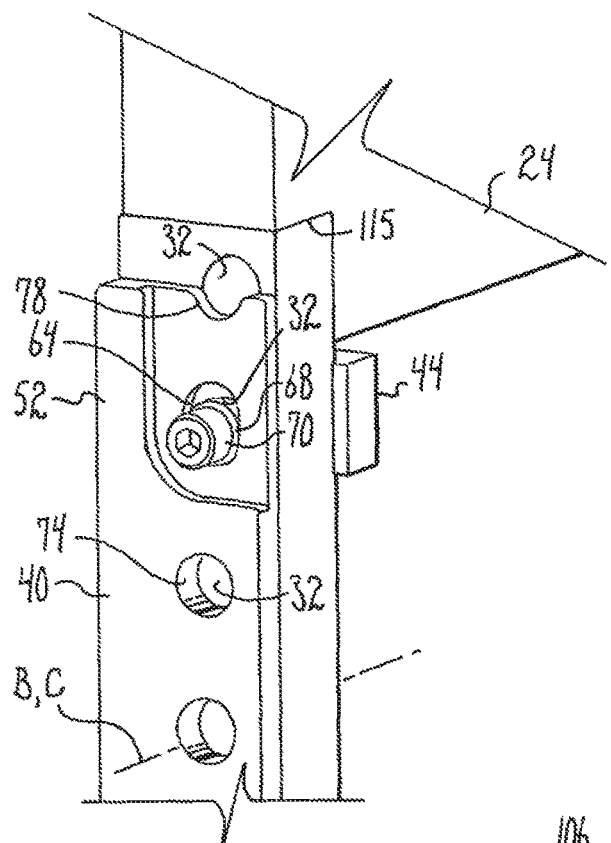
FIG. 11 is another view of the upper portion of the fail-safe release mechanism of FIG. 10, with the upper locking rod not shown, to show greater detail when a lower locking rod is inserted below the upper locking rod.
Figure 10:
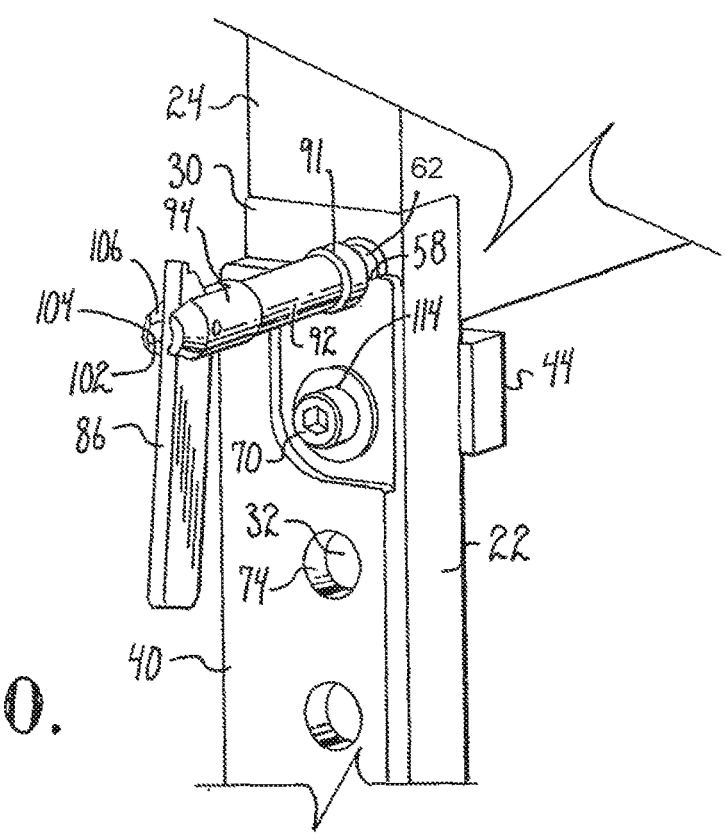
FIG. 10 is a perspective view of the upper portion of the fail-safe release mechanism of FIG. 8, including the upper locking rod, to show greater detail of the position of the locking member when a lower locking rod (not shown) is inserted below the upper locking rod and the locking member through-bores and the arm apertures are aligned.

At least one through-bore 74 is spaced downwardly from the oblong through-bore 64, said through-bores 74 being referred to herein as "lower through-bores" 74. In the illustrated embodiment, a plurality of lower through-bores 74 are spaced substantially evenly along the length of the locking member 40. It is foreseen that, in some embodiments, at least some of the lower through-bores 74 are unevenly spaced. The lower through-bores 74 are substantially alignable with adjacent apertures 32 of the respective attached arm 22. Since the locking member 40 is movable between the first and second positions, the lower through-bores 74 can be moved between non-aligned and aligned positions with respect to the adjacent apertures 32. In particular, when the locking member 40 is in the first position, such as is shown in FIGS. 8 and 9, the lower through-bores 74 and the adjacent apertures 32 are misaligned. When the locking member 40 is in the second position, such as is shown in FIG. 12, the lower through-bores 74' are axially aligned with the adjacent apertures 32' and also with respect to axis E.

Figure 14:
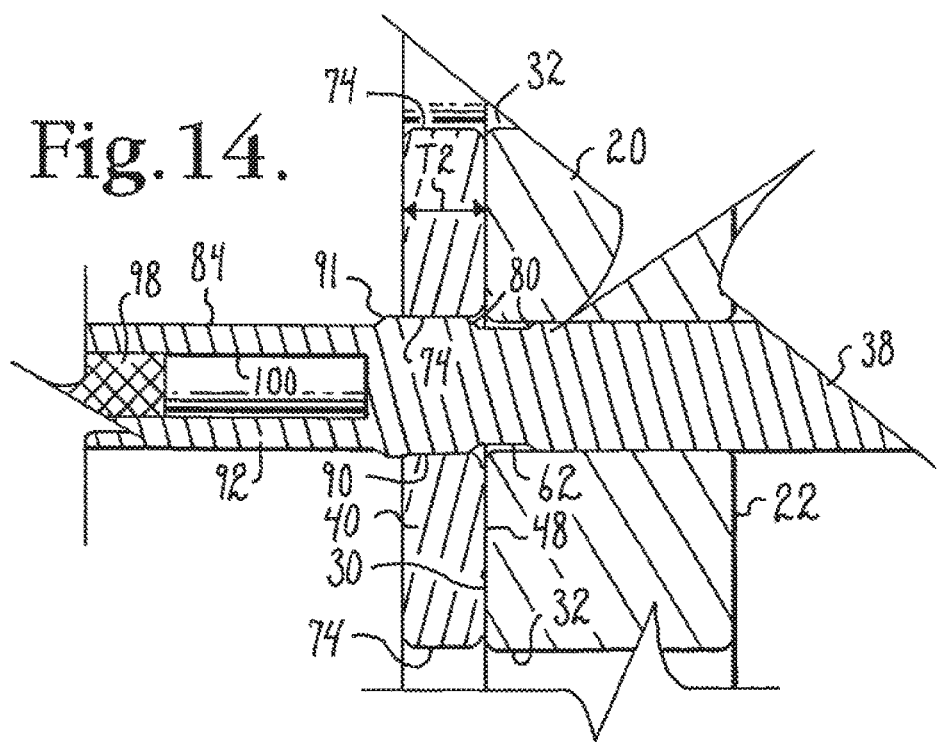
FIG. 14 is an enlarged view of a lower left-hand portion of the fail-safe release mechanism of FIG. 12.

It is noted that the U-shaped notch is size, shaped and located such that when the locking member 40 is in the first position, a key member 38 or locking rod, is insertable, or receivable, through the uppermost arm aperture 32, while at the same time the lower through-bores 74 and the associated apertures 32 are substantially misaligned (see FIGS. 8-9). Further, when the locking member 40 is in the second position, lower through-bores 74 and the associated apertures 32 are substantially aligned such that a key member 38 is insertable therethrough, such as is shown in FIG. 14, while at the same time insertion of a key member 38 through the uppermost arm aperture 32 is substantially blocked by a portion 78 of the locking member 40 associated with, or surrounding, the U-shaped notch 58, such as is shown in FIG. 13.

Figure 15:
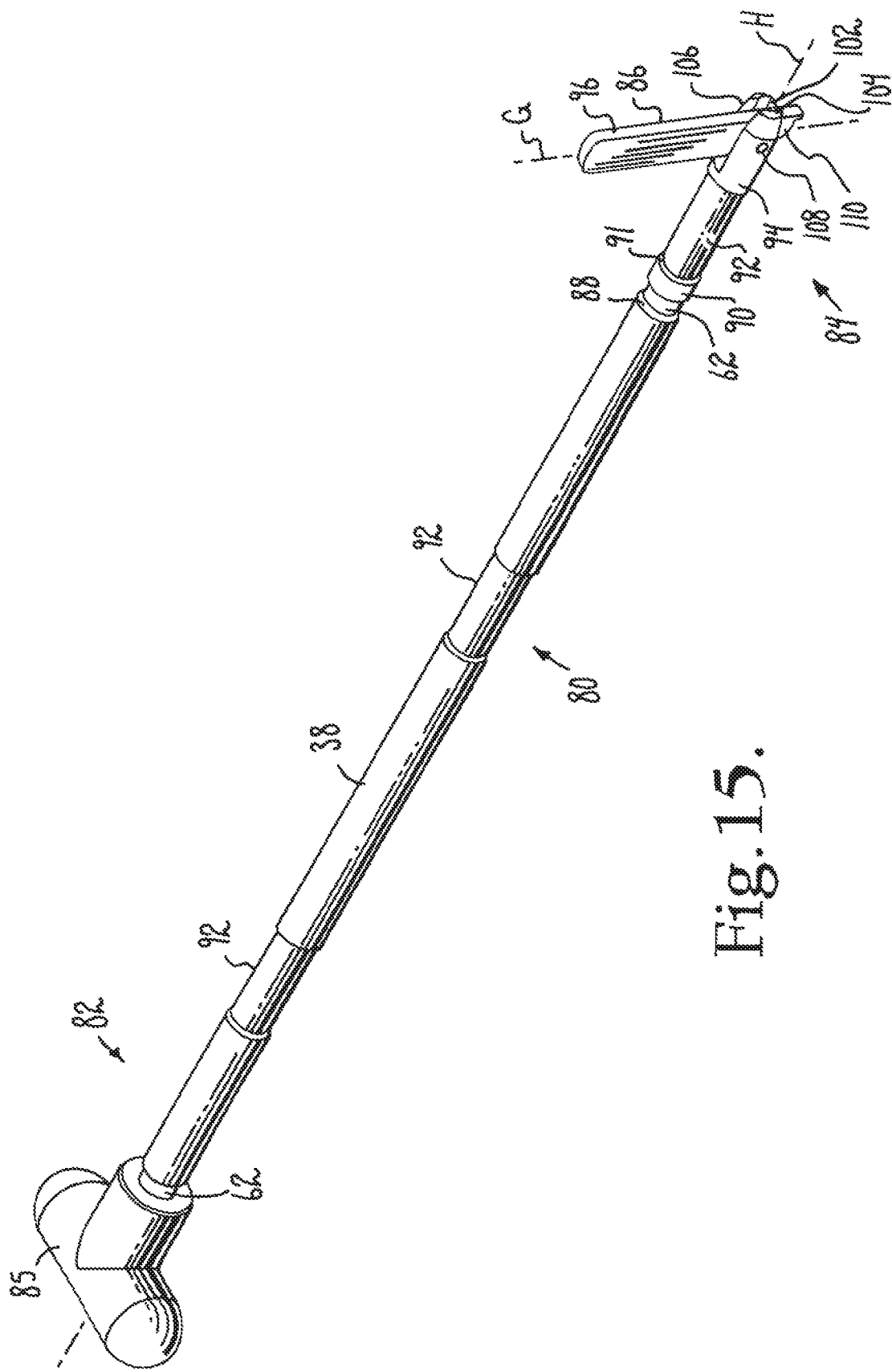
FIG. 15 is an enlarge perspective view of a locking rod of the fail-safe release mechanism of FIG. 1.
Figure 16:
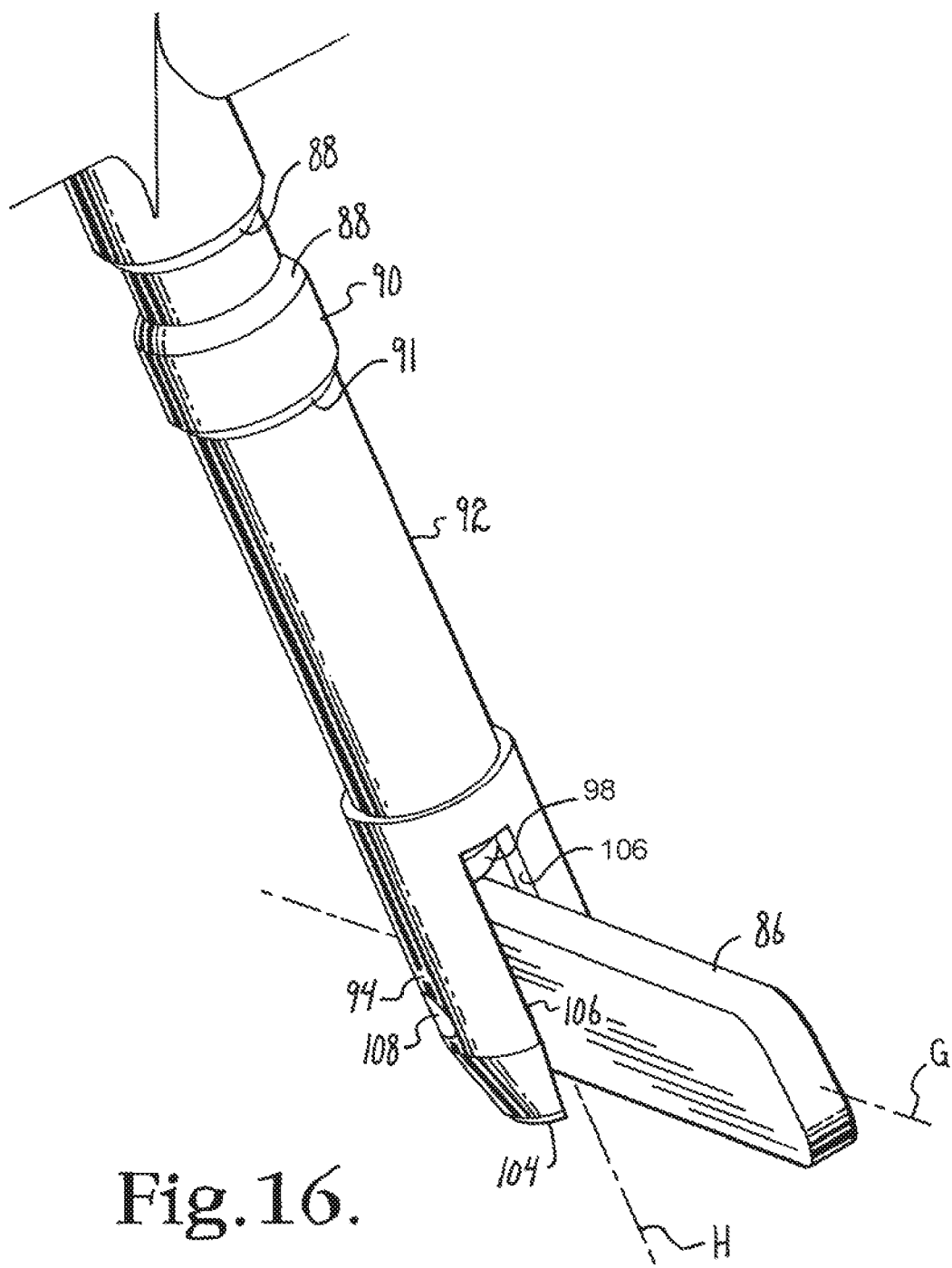
FIG. 16 is an enlarge view of a portion of the locking rod of FIG. 15.

FIGS. 15-16 illustrate an exemplary key member 38 of the fail-safe release mechanism 1. The key member 38 includes a longitudinally extending, substantially cylindrical body 80 with first and second ends that are generally denoted by the numerals 82, 84, respectively. A handle portion 85 is joined to the body first end 82, and a spring-loaded latch 86 is located at the second end 84.

The body 80 includes at least one key notch portion 62, and preferably at least two key notch portions 62. For example, in the illustrated embodiment, a key notch portion 62 is located at each of the body first and second ends 82, 84. As shown in FIGS. 12-14, the key notch portions 62 are located along the length of the key member body 80 so as to be engageable with the U-shaped notches 58 of the locking members 40 when the key member 38 is inserted through the arm top aperture 32.

Each key notch portion 62 is generally cylindrical in shape, with a circular cross-section and chamfered ends 88. The key notch portions 62 have a reduced diameter relative to a diameter of the body 80. The chamfers 88 provide a substantially smooth transition between the diameter of the key notch portions 62 and the diameter of the body 80.

Adjacent to the second end key notch portion 62, is a key ring portion 90. The key ring portion 90 includes another chamfer 91 joining it with an adjacent narrowed portion 92 of the body 80. When the key member 38 is pushed through an adjacent lower through-bore 74 and aperture 32 that are misaligned (e.g., the locking member 40 is in the first position), the chamfer 91 engages the locking member 40, pushing or urging the locking member 40 upward until the through-bore 74 and the aperture 32 become axially aligned (see FIG. 14) and the locking member 40 is in the second position.

Urging the locking member 40 upward causes the U-shaped notch 58 to engage the key notch portion 62 of the upper key member 38 (see FIG. 13), which in turn locks the upper key member 38 in place, thereby substantially preventing or blocking the removal of the upper key member 38 from the fail-safe assembly 1. Accordingly, when the U-shaped notch 58 and the key notch portion 62 are engaged, the upper key member 38 in substantially non-removable or substantially blocked from being removed.

It is noted that, with respect to the lower key member 38, shown in FIG. 14, the portion of the locking member 40 associated with the through-bore 74 (e.g., through which the lower key member 38 is inserted) includes a thickness T2 that is sufficient to prevent or block engagement of the key notch portion 62 adjacent to the key ring portion 90. Accordingly, the through-bore 74 cannot engage the key notch portion 62 of the lower key member 38.

Furthermore, with respect to the upper key member 38 shown in FIG. 13, the locking member cut-out portion 56 provides a reduced thickness T1 at the U-shaped notch 58. Thus, instead of the key ring portion 90 of the upper key member 38 being engageable by the locking member 40, the U-shaped notch 58 is urged upward into the key notch portion 62, and into mating engagement therewith, such as when the locking member 40 is urged upward to the second position by the lower key member 38. Accordingly, removal of the lower key member 38 from the assembly 1 enables disengagement of the U-shaped notch 58 from the key notch portion 62 of the upper key member 38 (e.g., the locking member 40 is returned to the first position), such that the upper key member 38 is then removable from the associated top arm apertures 32.

Referring again to FIG. 15, the key member body 80 includes a diameter that is substantially equal to the diameters of the through-bores 74 and apertures 32. The body 80 includes at least one attention portion 92 with a diameter that is reduced relative to the diameter of the body 80. The attention portion 92 is operable to draw an operator's attention to the fail-safe release mechanism 1 and which key member 38 he or she is removing therefrom. For example, when the lower key member 38 is removed from the assembly 1, such as by pulling on the handle 85, the attention portion 92 sequentially engages and disengages the associated through-bore 74. This sequential engagement creates a bumping action that acts as a signal or notification to the operator that he or she is removing the lower key member 38.

If a patient is on the patient support structure 10 when the lower key member 38 is pulled through the through-bore 74, a downward force caused by the weight of the patient on the patient support structure 10 cooperates with the attention portion 92 to render removal of the lower key member 38 from the fail-safe assembly 1 substantially difficult to nearly impossible. Accordingly, the weight of the patient on the patient support structure 10 cooperates with the attention portion 92 to substantially block removal of the lower key member 38 from the fail-safe release mechanism 1, which in turn substantially blocks removal of the upper key member 38 due to the associated engagement of at least one upper key member portion 62 with a U-shaped notch 58, such as is most easily seen in FIG. 12.

Referring to FIGS. 12-13 and 15-16, the key member second end 84 includes a latch member 86 with a head member 94, a blade member 96 and a spring-loaded set pin 98. The blade member 96 has a width W that is slightly smaller than the diameter of the through-bores 74 and apertures 32, through which it is passable. The head member 94 includes a longitudinally extending channel 100 that extends a distance into the body 80 toward the body first end 82. The channel 100 includes an opening 102 at the end 104 of the head member 94, and a radial slot 106. The radial slot 106 is sized and shaped to receive the blade member 96 therein.

Referring to FIGS. 13 and 15, a small axle 108 pivotably holds the blade member 96 within the slot 106 such that the blade member 96 is movable between a first orientation and a second orientation. When in the first orientation, a longitudinal axis G of the blade member 96 is substantially parallel with a longitudinal axis H of the key member 38, or the body 80. When in the second orientation, the blade member longitudinal axis G is substantially non-parallel with the body longitudinal axis H. When the blade member 96 is in the first orientation, or the axes G and H are substantially parallel, and the key member 38 is pulled by the handle 85, as if to withdraw the key member 38 from the fail-safe release mechanism 1, the key member 38 is removable from the fail-safe assembly 1, such that the key member 38 can be pulled out of the fail-safe assembly 1. However, when the blade member 96 is in the second orientation, or the axes G and H are non-parallel, and the key member 38 is pulled, the blade member 96 engages the outer surface 50 of the adjacent locking member 40, thereby substantially blocking removal of the key member 38 from the fail-safe assembly 1. Accordingly, when the blade member 96 is in the second orientation, the key member 38 is substantially non-removable from the fail-safe assembly 1.

The set pin 98 is spring loaded and engages the blade member rear end 110, so as to urge the blade member 96 into the second orientation. The blade member 96 is manually pivotable by the operator to the first orientation so that the key member 38 can be removed from the fail-safe assembly 1.

Alternative configurations of the fail-safe release assembly 1 of the present invention are foreseen. In particular, one or more of the mechanical structures of the fail-safe release assembly 1 may be replaced with a combination of mechanical and electronic structures, or may be moved, either in whole or in part to other portions of the patient positioning support apparatus. Additionally, two or more of the structures of these foreseen alternatively configured fail-safe release assemblies 1 may be mechanically linked, electronically synched, or a combination thereof. Numerous variations are foreseen.

Methods of Use

In another embodiment, a method of using the fail-safe release mechanism 1 of the present invention is provided. As discussed above, the fail-safe release mechanism 1 can be used to retrofit existing patient positioning support apparati 4, 5. Alternatively, new patient positioning support apparati can be fabricated such that they include the fail-safe release mechanism 1, including an interlock with first and second interlock portions, wherein the first and second interlock portions cooperate with each other, whereby actuation of the second interlock portion substantially blocks de-actuation of the first interlock portion. It is foreseen that the first and second interlock portions may be electronically synched, mechanically engaged, or a combination thereof.

To retrofit an existing patient positioning support apparatus 4, 5 with a fail-safe release mechanism 1, the locking members 40 are first attached to the connection subassembly arms 22. Each arm 22 is slidingly engaged with a locking member 40 so as to engagingly receive a locking member foot portion 111 at its lower end 112. Then, the aperture 32 second from the top of the arm 22 is substantially aligned with an adjacent oblong through-bore 64. A bolt 42 is inserted through a bushing 68, which are then inserted together through the aligned oblong through-bore 64 and aperture 32. The bolt 42 is rotatably engaged with, or attached to, a nut member 44 on the arm inner side 28. In some circumstances, a washer 114 spaces the bolt head 70 from the bushing 68, such that the bolt 42 and nut member 44 can be tightened, or snugged up, but sufficient space remains for the locking member cut-out portion 56 to slide between the washer 114 and the arm outer side 30.

After the locking member 40 and the arm 22 have been slidingly attached to one another, the lower through-bores 74 and adjacent apertures 22, also referred to herein as bore-aperture pairs 120, have aligned and misaligned configurations. When the bore-aperture pairs 120 are in the misaligned configuration, the locking member 40 is downwardly located with respect to the arm 22, and in the first position described above with respect to FIGS. 8-9. In the first position, the lower through-bores 74 are substantially misaligned with the adjacent apertures 22. When the bore-aperture pairs 120 are in the aligned configuration, the locking member 40 is upwardly located with respect to the arm 22, and in the second position described above with respected to FIGS. 1, 2 and 10-14. In the second position, the lower through-bores 74 are substantially aligned with the adjacent apertures 22.

The arms 22 are then attached to the rotator member 24 in an orientation such that the attached locking members 40 are located at the arm outer sides 30, such as is shown in FIGS. 1 and 12. The arms 22 are attached by engaging the arm upper ends 23 with the lower attachment portions 115 of the rotator 24, followed by insertion of an upper key member 38 through the arm top apertures 32 and an axially aligned elongate rotator through-bore 118 that extends through the rotator member 24, whereby the base structure-to-connection subassembly attachment is formed.

After the arms 22 have been attached to the rotator member 40, the lower key member 38 is insertable through any of the remaining lower bore-aperture pairs 120. In some circumstances, the patient support structure 10 is also attached to the arms 22 during attachment of the lower key member 38 to the fail-safe release mechanism 1, whereby the patient support structure 10 is attached to the connection subassembly 11, and whereby the connection subassembly-to-patient support structure attachment is formed.

Referring now to FIG. 12, and using the reference terms "right-hand" and "left-hand" to refer to the locking members 40 associated with the right- and left-hand sides of the Figure, it is noted that when the lower key member 38 is inserted through the right-hand bore-aperture pair 120 (e.g., such as by aligning axes G, H and E, inserting the blade member 96 into the right-hand bore-aperture pair 120 and pushing the handle 85 toward the left; so as to actuate at least a portion of the second interlock portion), the chamfer 91 and the key ring portion 90 urge the right-hand locking member 40 upward with respect to the attached arm 32 (e.g., from the first position to the second position). As a result, the right-hand locking member U-shaped notch 58 lockingly engages the right-hand key notch portion 62 of the prior installed upper key member 38, such that at least a portion of the first interlock portion is engaged.

Then, as the key lower member 38 is pushed through the left-hand bore-aperture pair 120 (e.g., the second interlock portion is fully engaged), the chamfer 91 and the key ring portion 90 urge the left-hand locking member 40 upward with respect to the attached arm 32 (e.g., into the second position). The ring member 90 maintains the position of the left-hand locking member 40 such that the bore-aperture pair 120 remains in an aligned configuration. Similar to as was described with respect to the right-hand locking member 40, the left-hand locking member U-shaped notch 58 lockingly engages the key notch portion 62 of the prior installed upper key member 38, whereby the first interlock portion is fully engaged.

With reference to FIG. 12, it is noted that each key member 38 includes a length between the key notch portion 62 adjacent to the handle 85 and the key ring portion 90 such that when the key member 38 is used as a lower key member 38, the associated handle 85 abuts the outer surface 50 of the right-hand locking member 40. Due to the greater thickness T2 of this portion of the right-hand locking member 40 and the relative length of the key member 38, the key ring portion 90 is located so as to be aligned with and engage the through-bore 32 of the left-hand bore-aperture pair 120'. Consequently, the key notch portion 62 adjacent to the key ring portion 90 is substantially non-engageable by the left-hand locking member 40.

In contrast, with respect to the upper key member 38, due to the reduced thickness T1 of the locking members 40 associated with the cut-out portions 56, both of the key notch portions 62 of the upper key member 38 are engageable by the U-shaped notches 58 of the respective right-hand and left-hand locking members 40. This configuration ensures that when the lower key member 38 is inserted into the fail-safe assembly 1, the upper key member 38 is substantially locked in place and therefore substantially non-removable. Accordingly, actuation of the second interlock portion, which in this exemplary embodiment is defined by the lower bore-aperture pairs 120, 120' and the lower key member 38, substantially blocks de-actuation of the first interlock portion, which in this exemplary embodiment is defined by the U-shaped notches 58 and the upper key member 38.

To disassemble the patient support structure 10 from the base structure 8, the installation steps are simply reversed. In the illustrated embodiment, the second interlock portion is first de-actuated by removing the lower key member 38, with concomitant removal of the patient support structure 10 from the connection subassembly 11. Then, the first interlock portion is de-actuated by removing the upper key member 38, such that the arms 22, with the attached locking members 40, are detached from the rotator member 24. It is not necessary to remove the locking members 40 from the arms 22. Subsequent to the first installation, the locking members 40 are generally left attached to the arms 22. However, the locking members 40 are removable from the arms 22, such as for cleaning, replacement, and the like.

All numbers expressing quantities, measurements, and so forth used in the specification and claims are to be understood as being modified in all instances by the term "about." Accordingly, unless indicated to the contrary, the numerical parameters set forth in the specification and attached claims are approximations that can vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

All references cited herein, including but not limited to published and unpublished applications, patents and literature references are incorporated herein by reference in their entirety and are hereby made a part of this specification. To the extend that publications, patents or patent applications incorporated by reference contradict the disclosure contained in the specification, the specification is intended to supersede and/or take precedence over any such contradictory material.

It is to be understood that while certain forms of the present invention have been illustrated and described herein, it is not to be limited to the specific forms or arrangement of parts described and shown.

The invention claimed is:

1. A method of attaching and supporting a first patient support structure and a second patient support structure relative to a base structure, the method comprising providing a first upright end support having a first lower end and a second upper end, the first lower end being supported relative to a floor, and the second upper end being spaced above the first lower end;

rotatably supporting a first rotator member on the first upright end support adjacent the second upper end thereof, the first rotator member being configured to turn around a rotational axis substantially perpendicular to the first rotator member;

releasably joining a first attachment portion of a first turning connection subassembly to the first rotator member;

moving a first rod body of the first turning connection subassembly along a first bracket connecting portion of the first turning connection subassembly that extends outwardly from the first attachment portion;

releasably joining a first end of the first patient support structure with the first bracket connecting portion via engagement of a first connection bracket of the first patient support structure with the first rod body by movement of a first moveable engagement portion along the first bracket connecting portion from a first position to a second position to engage the second rod body; and releasing, when the first moveable engagement portion is in the second position, the first attachment portion from the first rotator member:

releasably joining a second attachment portion of a second turning connection subassembly to the first rotator member;

moving a second rod body of the second turning connection subassembly along a second bracket connecting portion of the second turning connection subassembly that extends outwardly from the second attachment portion; and releasably joining a first end of the second patient support structure with the second bracket connecting portion via engagement of a second connection bracket of the second patient support structure with the second rod body by movement of a second moveable engagement portion along the second bracket connecting portion from a first position to a second position to engage the second rod body; and releasing, when the first moveable engagement portion is in the second position, the first attachment portion from the first rotator member.

2. The method of claim 1, wherein: the first rod body is moveable along a first longitudinal axis of the first bracket connecting portion; and the second rod body is moveable along a second longitudinal axis of the second bracket connecting portion.

3. The method of claim 2, wherein: the first connection bracket is pivotable about a first transverse axis of the first rod body that is transverse to the first longitudinal axis, and the second connection bracket is pivotable about a second transverse axis of the second rod body that is transverse to the second longitudinal axis.

4. The method of claim 1, further comprising preventing the first connection bracket from being released with respect to the first turning connection subassembly when the first moveable engagement portion is moved from the first position to the second position, and a portion of the first moveable engagement portion is engaged to the first rod body.

5. The method of claim 4, further comprising preventing the second connection bracket from being released with respect to the second turning connection subassembly when the second moveable engagement portion is moved from the first position to the second position, and a portion of the second moveable engagement portion is engaged to the second rod body.

6. The method of claim 1, wherein: the first attachment portion of the first turning connection subassembly is releasably joined with one of a lower side portion of the first rotator member and an upper side portion of the first rotator member opposite the lower side portion; and the second attachment portion of the second turning connection subassembly is releasably joined with the other of the lower side portion of the first rotator member and the upper side portion of the first rotator member.

7. The method of claim 1, wherein the first and second connection brackets are configured as attachment structures in a shape of hooks.

8. The method of claim 1, wherein: the first rod body is slidable into and out of portions of the first bracket connecting portion; and the second rod body is slidable into and out of portions of the second bracket connecting portion.

9. The method of claim 1, further comprising providing a second upright end support opposite the first upright end support to support each of a second end of the first patient support structure and a second end of the second patient support structure.

10. The method of claim 9, further comprising rotatably supporting a second rotator member on the second upright end support; wherein the second ends of the first patient support structure and the second patient support structure are attached relative to the second rotator member.

11. A method of attaching and supporting a first patient support structure and a second patient support structure relative to a base structure, the method comprising providing a first upright end support having a first lower end and a second upper end, the first lower end being supported relative to a floor, and the second upper end being spaced above the first lower end;

rotatably supporting a first rotator member on the first upright end support adjacent the second upper end thereof, the first rotator member being configured to turn around a rotational axis substantially perpendicular to the first rotator member;

releasably joining a first attachment portion of a first turning connection subassembly to the first rotator member;

moving at least a first rod body of the first turning connection subassembly along a first longitudinal axis of a first bracket connecting portion of the first turning connection subassembly that extends outwardly from the first attachment portion, the a movement of the at least a first rod body spacing the at least a first rod body closer to or further from the first rotator member;

releasably joining a first end of the first patient support structure with the first bracket connecting portion via engagement of a first connection bracket of the first patient support structure with the at least a first rod body by movement of a first moveable engagement portion along the first bracket connecting portion from a first position to a second position to engage the first rod body, the first connection bracket being pivotable about the at least a first rod body;

releasing, when the first moveable engagement portion is in the second position, the first attachment portion from the first rotator member;

releasably joining a second attachment portion of a second turning connection subassembly to the first rotator member;

moving at least a second rod body of the second turning connection subassembly along a second longitudinal axis of a second bracket connecting portion of the second turning connection subassembly that extends outwardly from the second attachment portion, a movement of the at least a second rod body spacing the at least a second rod body closer to or further from the first rotator member; and releasably joining a first end of the second patient support structure with the second bracket connecting portion via engagement of a second connection bracket of the second patient support structure with the at least a second rod body by movement of a second moveable engagement portion along the second bracket connecting portion from a first disengaged position to a second position to engage the second rod body, the second connection bracket being pivotable about the at least a second rod body; and releasing, when the second moveable engagement portion is in the second position, the second attachment portion from the first rotator member.

12. The method of claim 11, wherein: the first connection bracket is pivotable about a first transverse axis of the at least a first rod portion body that is transverse to the first longitudinal axis; and the second connection bracket is pivotable about a second transverse axis of the at least a second rod portion body that is transverse to the second longitudinal axis.

13. The method of claim 11, further comprising preventing the first connection bracket from being released with respect to the first turning connection subassembly when the first moveable engagement portion is moved from the first position to the second position, and a portion of the first moveable engagement portion is engaged to the at least a first rod body.

14. The method of claim 13, further comprising preventing the second connection bracket from being released with respect to the second turning connection subassembly when the second moveable engagement portion is moved from the first position to the second position, and a portion of the second moveable engagement portion is engaged to the at least a second rod body.

15. The method of claim 11, wherein: the first attachment portion of the first turning connection subassembly is releasably joined with one of a lower side portion of the first rotator member and an upper side portion of the first rotator member opposite the lower side portion; and the second attachment portion of the second turning connection subassembly is releasably joined with the other of the lower side portion of the first rotator member and the upper side portion of the first rotator member.

16. The method of claim 11, wherein the first and second connection brackets are configured as attachment structures in the shape of hooks.

17. The method of claim 11, further comprising providing a second upright end support opposite the first upright end support to support each of a second end of the first patient support structure and a second end of the second patient support structure, rotatably supporting a second rotator member on the second upright member end support, and attaching the second ends of the first patient support structure and the second patient support structure relative to the second rotator member.

18. A method of attaching and supporting a first patient support structure and a second patient support structure relative to a base structure, the method comprising
providing a first upright end support and a second upright end support; rotatably supporting a first rotator member on the first upright end support
and a second rotator member on the second upright end support;
releasably joining a first attachment portion of a first turning connection subassembly to the first rotator member;
moving at least a first rod body of the first turning connection subassembly along a first longitudinal axis of a first bracket connecting portion of the first turning connection subassembly that extends outwardly from the first attachment portion, a movement of the at least a first rod body spacing the at least a first rod body closer to or further from the first rotator member;
releasably joining a first end of the first patient support structure with the first bracket connecting portion via engagement of a first connection bracket of the first patient support structure with the at least a first rod body by movement of a first moveable engagement portion along the first bracket connecting portion from a first position to a second position to engage the first rod body, the first connection bracket being pivotable about the at least a first rod body;
releasing, when the first moveable engagement portion is in the second position, the first attachment portion from the first rotator member;
releasably joining a second attachment portion of a second turning connection subassembly to the first rotator member;
moving at least a second rod body of the second turning connection subassembly along a second longitudinal axis of a second bracket connecting portion of the second turning connection subassembly that extends outwardly from the second attachment portion, the movement of the at least a second rod body spacing the at least a second rod body closer to or further from the first rotator member;
releasably joining a first end of the second patient support structure with the second bracket connecting portion via engagement of a second connection bracket of the second patient support structure with the at least a second rod body by movement of a second moveable engagement portion along the second bracket connecting portion from a first position to a second position to engage the second rod body, the second connection bracket being pivotable about the at least a second rod body;
releasing, when the second moveable engagement portion is in the second position, the second attachment portion from the first rotator member; and
attaching a second end of the first patient support structure and a second end of the second patient support structure relative to a second rotator member.

19. The method of claim 18, further comprising preventing the first connection bracket from being released with respect to the first turning connection subassembly when the first moveable engagement portion is moved from the first position to the second position, and a portion of the first moveable engagement portion is engaged to the at least a first rod body.

20. The method of claim 19, further comprising preventing the second connection bracket from being released with respect to the second turning connection subassembly when the second moveable engagement portion is moved from the first position to the second position, and
a portion of the second moveable engagement portion is engaged to the at least a second rod body.

* * * * *